United States Patent
Hoshino et al.

(10) Patent No.: US 8,338,529 B2
(45) Date of Patent: Dec. 25, 2012

(54) OIL REPELLENT COPOLYMER, METHOD FOR ITS PRODUCTION AND OIL REPELLENT TREATMENT SOLUTION

(75) Inventors: Taiki Hoshino, Chiyoda-ku (JP); Naoko Shirota, Chiyoda-ku (JP); Nobuyuki Otozawa, Chiyoda-ku (JP); Akihiko Asakawa, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 560 days.

(21) Appl. No.: 12/499,321

(22) Filed: Jul. 8, 2009

(65) Prior Publication Data

US 2009/0281239 A1    Nov. 12, 2009

Related U.S. Application Data

(63) Continuation of application No. PCT/JP2008/050297, filed on Jan. 11, 2008.

(30) Foreign Application Priority Data

Jan. 17, 2007 (JP) ................................. 2007-007965
Jul. 10, 2007 (JP) ................................. 2007-181051

(51) Int. Cl.
*C08L 75/00* (2006.01)

(52) U.S. Cl. ........... 524/589; 528/45; 528/245; 524/366

(58) Field of Classification Search ........... 524/589, 524/366, 245; 528/45
See application file for complete search history.

(56) References Cited

U.S. PATENT DOCUMENTS

| | | | | |
|---|---|---|---|---|
| 4,909,806 | A | * | 3/1990 | Garbe ................ 8/647 |
| 6,894,105 | B2 | * | 5/2005 | Parent et al. ......... 524/520 |
| 6,933,338 | B2 | * | 8/2005 | Sugimoto et al. ...... 524/377 |
| 2004/0024100 | A1 | * | 2/2004 | Parent et al. ......... 524/366 |

FOREIGN PATENT DOCUMENTS

| | | | |
|---|---|---|---|
| EP | 2103635 A1 | * | 9/2009 |
| JP | 02-3407 | | 1/1990 |
| JP | 06-041462 | | 2/1994 |
| JP | 08-333424 | * | 12/1996 |
| JP | 10-237133 | * | 9/1998 |
| JP | 11-246627 | | 9/1999 |
| JP | 2005-533902 | | 11/2005 |
| WO | WO-2004/011512 A1 | * | 2/2004 |
| WO | WO-2008/087915 A1 | * | 7/2008 |

* cited by examiner

*Primary Examiner* — Peter D Mulcahy
*Assistant Examiner* — Henry Hu
(74) *Attorney, Agent, or Firm* — Oblon, Spivak, McClelland, Maier & Neustadt, L.L.P.

(57) ABSTRACT

To provide an oil repellent copolymer capable of forming an oil repellent film which is excellent in durability. An oil repellent copolymer characterized by comprising a repeating unit (A) having a polyfluoroalkyl group, a repeating unit (B) having a fluorescent functional group, and a repeating unit (C) having an ester bond other than an ester bond derived from acrylic acid, and/or a hydroxyl group.

16 Claims, No Drawings

OIL REPELLENT COPOLYMER, METHOD FOR ITS PRODUCTION AND OIL REPELLENT TREATMENT SOLUTION

TECHNICAL FIELD

The present invention relates to an oil repellent copolymer, a method for its production, and an oil repellent treatment solution using the oil repellent copolymer.

BACKGROUND ART

As a colored oil repellent polymer, the following Patent Document 1 discloses a fluorinated polymer having a chromophoric moiety.

Patent Document 1: JP-A-2-3407

SUMMARY OF INVENTION

Technical Problem

A colored fluorinated polymer has been suitably used as, for example, a coating agent having visibility and oil repellency. However, it has a problem in durability such that when the coating film is contacted with a solvent, the visibility or oil repellency tends to be easily impaired.

The present invention has been accomplished under the above circumstances, and it has an object to provide an oil repellent copolymer capable of forming an oil repellent film which not only has good oil repellency and visibility but also is excellent in durability, a method for its production, and an oil repellent treatment solution containing the copolymer.

Solution to Problem

In order to accomplish the object, the present invention provides an oil repellent copolymer characterized by comprising a repeating unit (A) having a polyfluoroalkyl group, a repeating unit (B) having a fluorescent functional group, and a repeating unit (C) having an ester bond other than an ester bond derived from acrylic acid, and/or a hydroxyl group.

It is preferred that it contains, as a part or all of the repeating unit (C), a repeating unit having a hydroxyl group, and it further contains a repeating unit (D) having an isocyanate group or a blocked isocyanate group.

Further, it is preferred that it further contains a repeating unit (E) having a linear alkyl group having at least 10 carbon atoms.

It is preferred that the repeating unit (A) is a repeating unit based on a (meth)acrylate having a polyfluoroalkyl group.

It is preferred that the repeating unit (B) is a repeating unit based on a (meth)acrylate having a fluorescent functional group.

It is preferred that the fluorescent functional group is at least one fluorescent functional group selected from the group consisting of pyrene type, coumarin type, flavone type and benzoxazole type groups.

Further, the present invention provides a method for producing an oil repellent copolymer, characterized by polymerizing a monomer material comprising a (meth)acrylate having a polyfluoroalkyl group, a (meth)acrylate having a fluorescent functional group, and a (meth)acrylate having an ester bond other than an ester bond derived from acrylic acid, and/or a hydroxyl group, in a solvent in the presence of a polymerization initiator.

It is preferred that the monomer material contains a (meth)acrylate having an isocyanate group or a blocked isocyanate group.

It is preferred that the monomer material contains a (meth)acrylate having a linear alkyl group having at least 10 carbon atoms.

Further, the present invention provides an oil repellent treatment solution characterized by comprising the oil repellent copolymer of the present invention and a fluorinated solvent.

ADVANTAGEOUS EFFECTS OF INVENTION

According to the oil repellent copolymer and the oil repellent treatment solution of the present invention, it is possible to form an oil repellent film which not only has good oil repellency and visibility but also is excellent in durability.

DESCRIPTION OF EMBODIMENTS

Repeating Unit (A)

The repeating unit (A) having a polyfluoroalkyl group is derived from a monomer having a polyfluoroalkyl group. The monomer is preferably a "(meth)acrylate having a polyfluoroalkyl group" wherein the hydrogen atom of a carboxyl group of (meth)acrylic acid is substituted by a group having a polyfluoroalkyl group.

In the present invention, a "polyfluoroalkyl group" means a group wherein at least two hydrogen atoms of an alkyl group which may contain an etheric oxygen atom or a thioetheric sulfur atom are substituted by fluorine atoms.

Further, a (meth)acrylate is a concept including one or both of an acrylate and a methacrylate.

The "(meth)acrylate having a polyfluoroalkyl group" is preferably a compound represented by the following formula (1). In the formula, $R^f$ represents a polyfluoroalkyl group, Q represents a divalent organic group, and R represents a hydrogen atom or a methyl group.

Here, in "$R^f$-Q-" in the following formula (1), the carbon atoms bonding to fluorine atoms are all contained in $R^f$, and "$R^{f'}$" and "Q" are determined so that among other carbon atoms, the number of carbon atoms contained in Q becomes largest.

For example, when "$R^f$-Q-" is "$CF_2H$—$CH_2$—$CH(OH)$—$CH_2$-", "$R^{f'}$" is "$CF_2H$-" and "-Q-" is "—$CH_2$—$CH(OH)$—$CH_2$—".

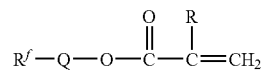

[1]

The number of carbon atoms in $R^f$ is preferably from 2 to 20, more preferably from 4 to 16. $R^f$ may have a linear structure or a branched structure, and a linear structure is preferred. In the case of a branched structure, it is preferred that a branched portion exists at the terminal portion of $R^f$, and the branched portion is a short chain which has from about 1 to 4 carbon atoms. The structure at the terminal portion of $R^f$ may, for example, be $CF_3CF_2$—, $(CF_3)_2CF$—, $CF_2H$— or $CFH_2$—, and $CF_3CF_2$— is preferred.

When the number of fluorine atoms in $R^f$ is represented by [(the number of fluorine atoms in $R^f$)/(the number of hydrogen atoms contained in an alkyl group having the same number of carbon atoms as in $R^f$)]×100(%), it is preferably at least 60%, more preferably at least 80%, most preferably 100%. $R^f$ at 100% will be referred to as a perfluoroalkyl group.

When $R^f$ is a perfluoroalkyl group, the number of carbon atoms in $R^f$ is preferably from 2 to 20, more preferably from 4 to 16. When the number of carbon atoms is within such a range, the polymerizability of a monomer made of the compound represented by the formula (1) and the solution stability after polymerization are good, and the oil repellent treatment solution is excellent in the initial oil repellency and durability of the oil repellency.

When $R^f$ is a perfluoroalkyl group, specific examples of $R^f$ may, for example, be the following groups (inclusive of structural isomers):

$C_4F_9$—: $F(CF_2)_4$—, $(CF_3)_2CFCF_2$—, $(CF_3)_3C$—, $CF_3CF_2(CF_3)CF$—, etc.
$C_5F_{11}$—: $F(CF_2)_5$—, etc.
$C_6F_{13}$—: $F(CF_2)_6$—, etc.
$C_7F_{15}$—: $F(CF_2)_7$—, $(CF_3)_2CF(CF_2)_4$—, etc.
$C_8F_{17}$—: $F(CF_2)_8$—, etc.
$C_9F_{19}$—: $F(CF_2)_9$—, $(CF_3)_2CF(CF_2)_6$—, etc.
$C_{10}F_{21}$—: $F(CF_2)_{10}$—, etc.
$C_{12}F_{25}$—: $F(CF_2)_{12}$—, etc.
$C_{11}F_{23}$—: $(CF_3)_2CF(CF_2)_8$—, etc.
$C_{14}F_{29}$—: $F(CF_2)_{14}$—, etc.
$C_{16}F_{33}$—: $F(CF_2)_{16}$—, etc.

When $R^f$ is a perfluoroalkyl group having an etheric oxygen atom or a thioetheric sulfur atom, specific examples may, for example, be the following groups, provided that k is an integer of from 1 to 5:

$F(CF_2)_kOCF(CF_3)$—,
$F(CF_2CF_2O)_kCF_2CF_2$—,
$F(CF_2CF_2CF_2O)_kCF_2CF_2$—,
$F[CF(CF_3)CF_2O]_kCF(CF_3)$—,
$F[CF(CF_3)CF_2O]_kCF(CF_3)CF_2CF_2$—,
$F(CF_2)_kSCF(CF_3)$—,
$F(CF_2CF_2S)_kCF_2CF_2$—,
$F(CF_2CF_2CF_2S)_kCF_2CF_2$—,
$F[CF(CF_3)CF_2S]_kCF_2CF_2$—,
$F[CF(CF_3)CF_2S]_kCF(CF_3)CF_2CF_2$—, etc.

$R^f$ is more preferably a linear perfluoroalkyl group. Specifically, $F(CF_2)_4$—, $F(CF_2)_5$—, $F(CF_2)_6$—, $F(CF_2)_7$—, $F(CF_2)_8$—, $F(CF_2)_9$—, $F(CF_2)_{10}$—, $F(CF_2)_{11}$— or $F(CF_2)_{12}$— is particularly preferred.

Examples of Q in the formula (1) may be the following groups, provided that $R^a$ represents a hydrogen atom or an alkyl group, each of p and q, which are independent of each other, is 0 or an integer of at least 1, p+q is an integer of from 1 to 22, and when $R^a$ is an alkyl group, the number of carbon atoms is preferably from 1 to 4:

—$(CH_2)_{p+q}$—,
—$(CH_2)_pCONR^a(CH_2)_q$—,
—$(CH_2)_pOCONR^a(CH_2)_q$—,
—$(CH_2)_pSO_2NR^a(CH_2)_q$—,
—$(CH_2)_pNHCONH(CH_2)_q$—,
—$(CH_2)_pCH(OH)(CH_2)_q$—,
—$(CH_2)_pCH(OCOR^a)(CH_2)_q$—, etc.

Among them, —$(CH_2)_{p+q}$—, —$(CH_2)_pCONR^a(CH_2)_q$— or —$(CH_2)_pSO_2NR^a(CH_2)_q$— (p represents 0 or an integer of at least 1, q represents an integer of at least 2, and p+q is from 2 to 6.) is more preferred, and an ethylene group, a propylene group, a butylene group, a pentamethylene group or a hexamethylene group is the most preferred.

As a "(meth)acrylate having a polyfluoroalkyl group", a perfluoro(meth)acrylate may preferably be the following compounds, provided that R represents a hydrogen atom or a methyl group:

$F(CF_2)_4CH_2OCOCR=CH_2$ [1-1],
$F(CF_2)_5CH_2OCOCR=CH_2$ [1-2],
$H(CF_2)_4CH_2OCOCR=CH_2$ [1-3],
$H(CF_2)_6CH_2OCOCR=CH_2$ [1-4],
$H(CF_2)_8CH_2OCOCR=CH_2$ [1-5],
$H(CF_2)_{10}CH_2OCOCR=CH_2$ [1-6],
$H(CF_2)_8CH_2CH_2OCOCR=CH_2$ [1-7],
$F(CF_2)_4CH_2CH_2OCOCR=CH_2$ [1-8],
$F(CF_2)_6CH_2CH_2OCOCR=CH_2$ [1-9],
$F(CF_2)_8CH_2CH_2OCOCR=CH_2$ [1-10],
$F(CF_2)_9CH_2CH_2OCOCR=CH_2$ [1-11],
$F(CF_2)_{10}CH_2CH_2OCOCR=CH_2$ [1-12],
$F(CF_2)_{12}CH_2CH_2OCOCR=CH_2$ [1-13],
$F(CF_2)_{14}CH_2CH_2OCOCR=CH_2$ [1-14],
$F(CF_2)_{16}CH_2CH_2OCOCR=CH_2$ [1-15],
$F(CF_2)_8(CH_2)_3OCOCR=CH_2$ [1-16],
$F(CF_2)_8(CH_2)_4OCOCR=CH_2$ [1-17],
$(CF_3)_2CF(CF_2)_4CH_2CH_2OCOCR=CH_2$ [1-18],
$(CF_3)_2CF(CF_2)_6CH_2CH_2OCOCR=CH_2$ [1-19],
$(CF_3)_2CF(CF_2)_8CH_2CH_2OCOCR=CH_2$ [1-20],
$(CF_3)_2CF(CF_2)_5(CF_2)_3OCOCR=CH_2$ [1-21],
$(CF_3)_2CF(CF_2)_5CH_2CH(OH)CH_2OCOCR=CH_2$ [1-22],
$(CF_3)_2CF(CF_2)_7CH_2CH(OH)CH_2OCOCR=CH_2$ [1-23],
$(CF_3)_2CF(CF_2)_5CH_2CH(OCOCH_3)OCOCR=CH_2$ [1-24],
$F(CF_2)_8SO_2N(CF_3)CH_2CH_2OCOCR=CH_2$ [1-25],
$F(CF_2)_8SO_2N(C_2H_5)CH_2CH_2OCOCR=CH_2$ [1-26],
$F(CF_2)_8SO_2N(C_3H_7)CH_2CH_2OCOCR=CH_2$ [1-27],
$F(CF_2)_8CONHCH_2CH_2OCOCR=CH_2$ [1-28].

Among from [1-1] to [1-28], a perfluoro(meth)acrylate is more preferably from [1-3] to [1-15], most preferably from [1-8] to [1-13].

The repeating unit (A) contained per molecule of the oil repellent copolymer may be of one type or of two or more types. A monomer for the repeating unit (A) is available from commercial products.

Among all repeating units constructing the oil repellent copolymer of the present invention, the proportion of the repeating unit (A) is preferably from 70 to 99 mass %, more preferably from 80 to 95 mass %. When the proportion is at least 70 mass %, the oil repellent treatment solution is excellent in the initial oil repellency and durability of the oil repellency, and when the proportion is at most 99 mass %, the copolymer is excellent in solubility in a solvent.

Repeating Unit (B)

The repeating unit (B) having a fluorescent functional group is derived from a monomer having a fluorescent functional group and a polymerizable group. The polymerizable group is not particularly limited, but a (meth)acryloyl group is preferred from the viewpoint of copolymerizability. That is, the repeating unit (B) is preferably derived from a "(meth) acrylate having a fluorescent functional group" wherein the hydrogen atom of a carboxyl group of (meth)acrylic acid is substituted by a group having a fluorescent functional group.

The fluorescent functional group is preferably one which emits fluorescence by ultraviolet light having a wavelength in a range of from 300 to 400 nm, and it is particularly preferably one which emits fluorescence with light of black light (wavelength: 365 nm) which is easy to handle. Specific examples may be groups derived from naphthalene, anthracene, phenanthrene, pyrene, perylene, coumarin, quinoline, flavone, benzofuran, indole, benzoxazole, benzimidazole, anthraquinone, carbazole, acridine, stilbene, azobenzene, rhodamine, fluorescein, porphyrin or their derivatives.

Specific examples of the monomer for the repeating unit (B) are as follows.
Monomers of the formulae (I-1) to (I-8), having a naphthalene type fluorescent functional group:
(I-1)
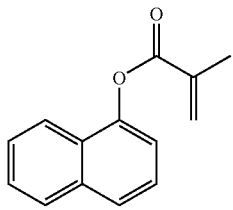
(I-2)
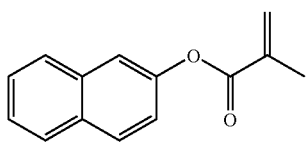
(I-3)
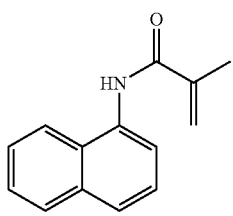
(I-4)
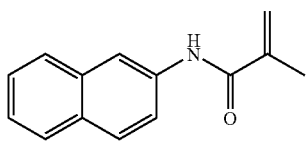
(I-5)
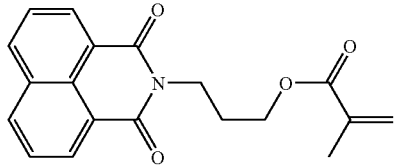
(I-6)
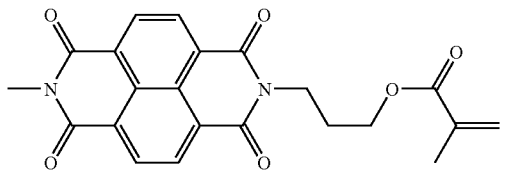
(I-7)
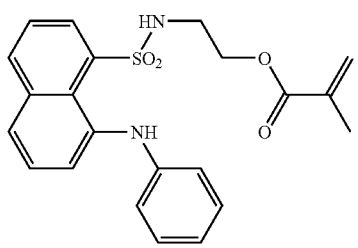
(I-8)
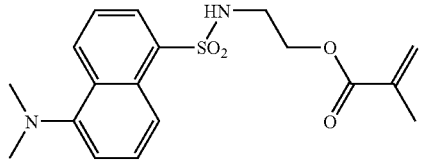
Monomers of the formulae (II-1) to (II-9), having an anthracene type fluorescent functional group:
(II-1)
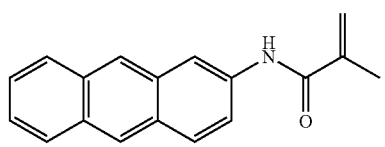
(II-2)
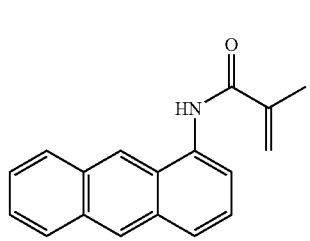
(II-3)
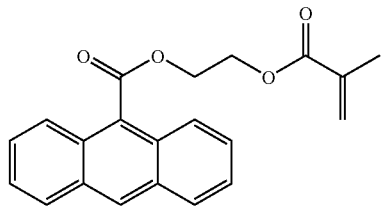
(II-4)
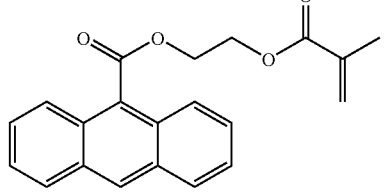
(II-5)
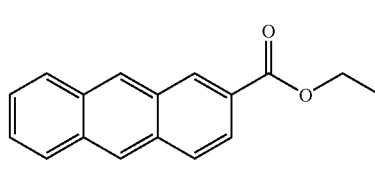
(II-6)
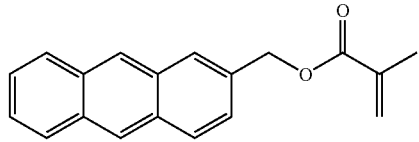

(II-7)
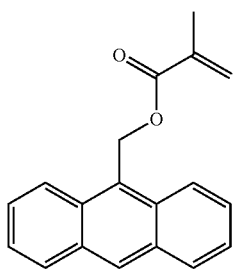
(III-4)
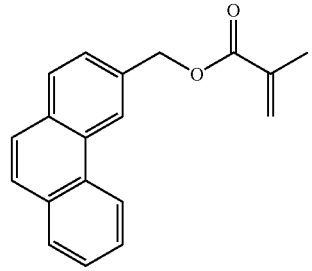
Monomers of the formulae (IV-1) to (IV-3), having a pyrene type fluorescent functional group:
(II-8)
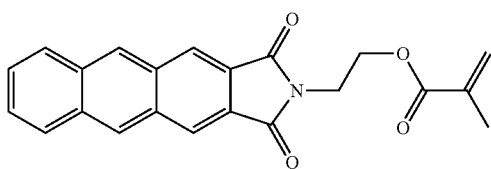
(IV-1)
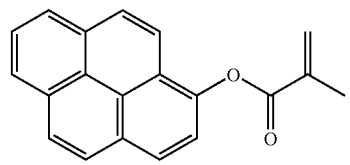
(II-9)
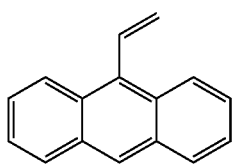
(IV-2)
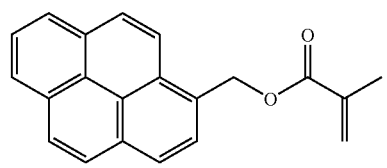
Monomers of the formulae (III-1) to (III-4), having a phenanthrene type fluorescent functional group:
(III-1)
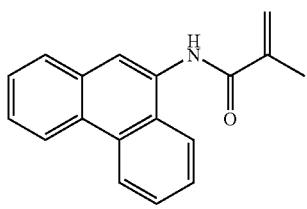
(IV-3)
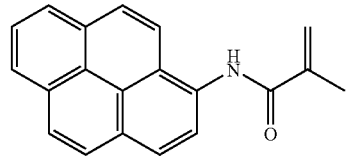
Monomers of the formulae (V-1) to (V-2), having a perylene type fluorescent functional group:
(III-2)
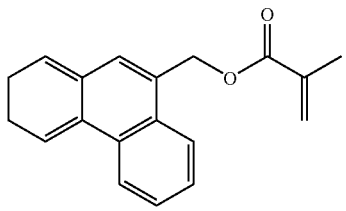
(V-1)
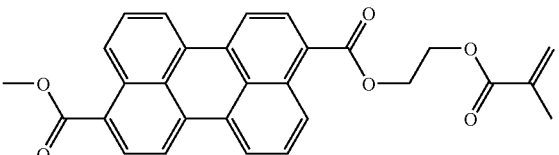
(III-3)
(V-2)
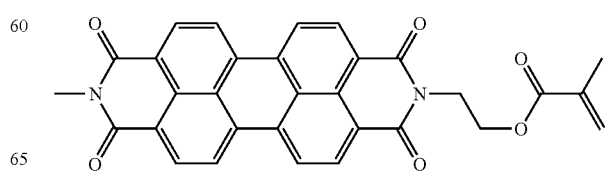

Monomers of the formulae (VI-1) to (VI-24), having a coumarin type fluorescent functional group:
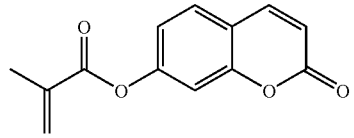
(VI-1)
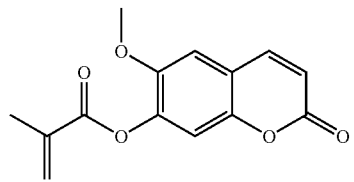
(VI-2)
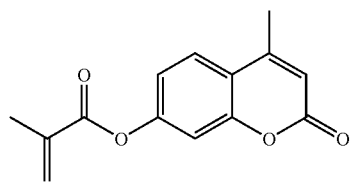
(VI-3)
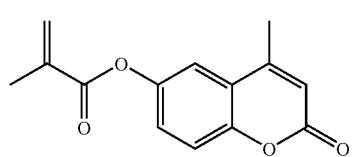
(VI-4)
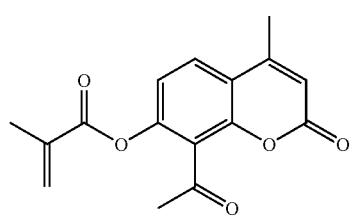
(VI-5)
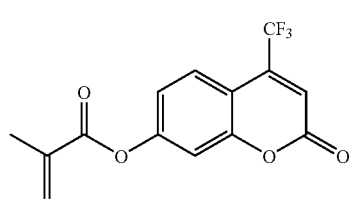
(VI-6)
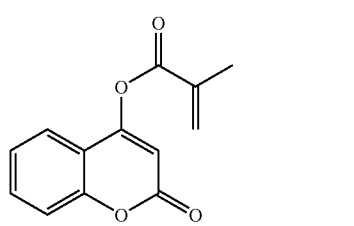
(VI-7)
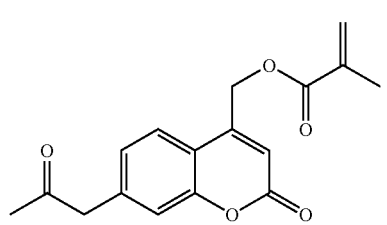
(VI-8)
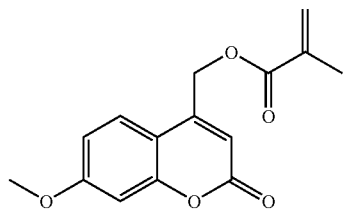
(VI-9)
(VI-10)
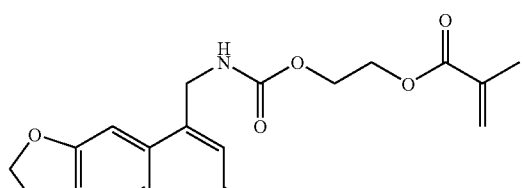
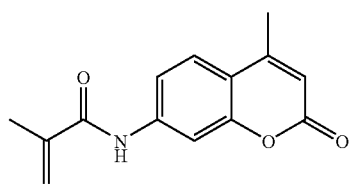
(VI-11)
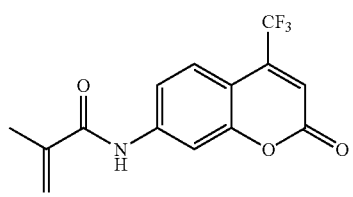
(VI-12)
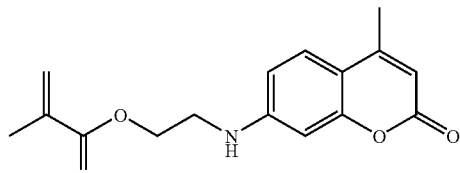
(VI-13)
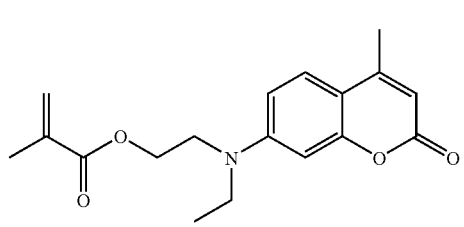
(VI-14)
(VI-15)

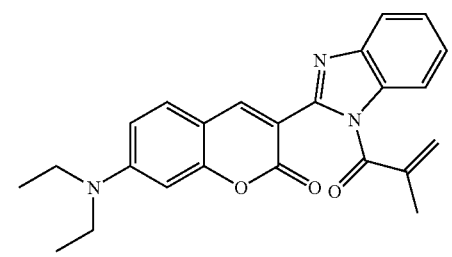
(VI-16)
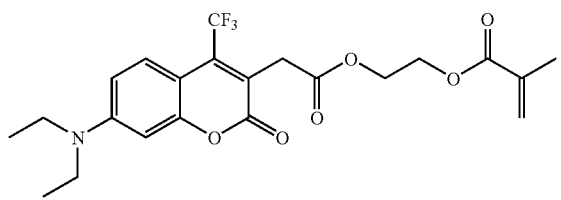
(VI-23)
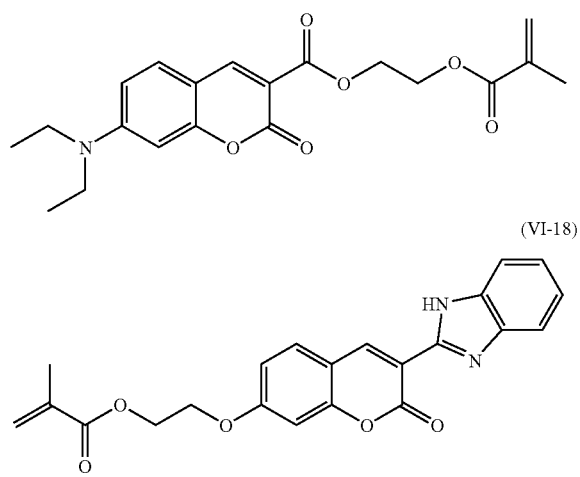
(VI-17)
(VI-18)
(VI-19)
(VI-20)
(VI-21)
(VI-22)
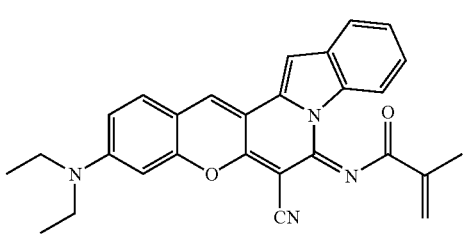
(VI-24)
Monomers of the formulae (VII-1) to (VII-19), having a quinoline type fluorescent functional group:
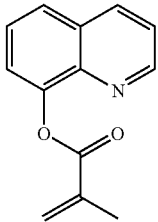
(VII-1)
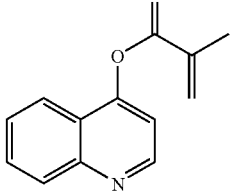
(VII-2)
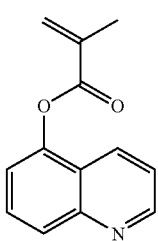
(VII-3)
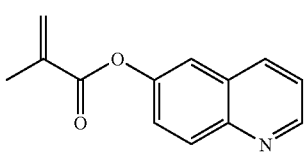
(VI-4)

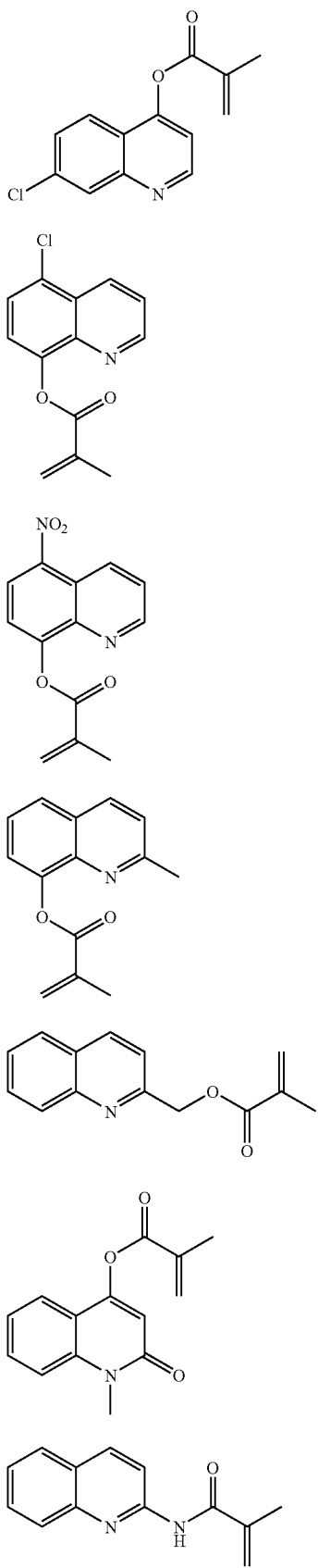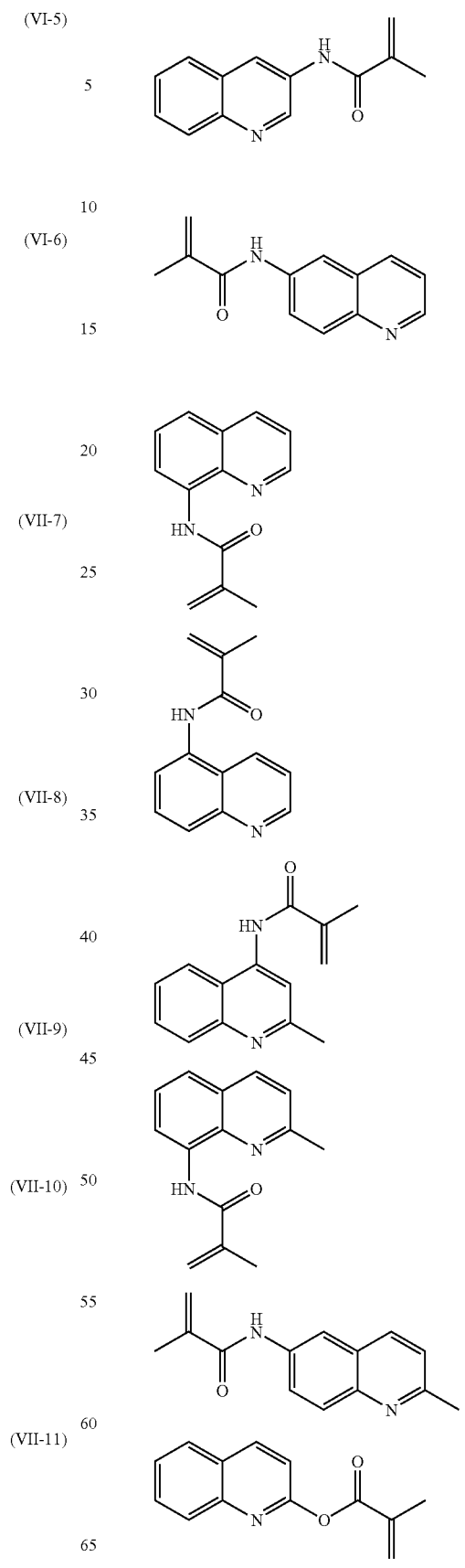

Monomers of the formulae (VIII-1) to (VIII-3), having a flavone type fluorescent functional group:
Monomers of the formulae (X-1) to (X-11), having an indole type fluorescent functional group:
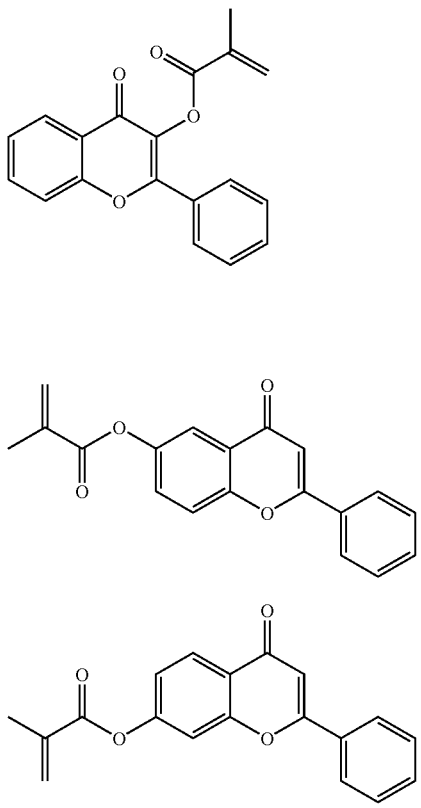
(VIII-1)
(VIII-2)
(VIII-3)
Monomers of the formulae (IX-1) to (IX-3), having a benzofuran type fluorescent functional group:
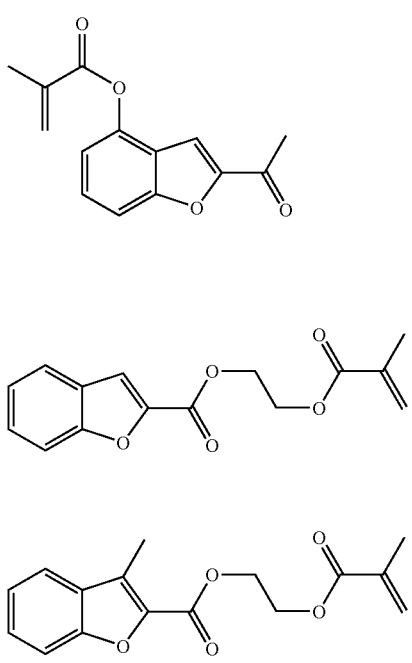
(IX-1)
(IX-2)
(IX-3)
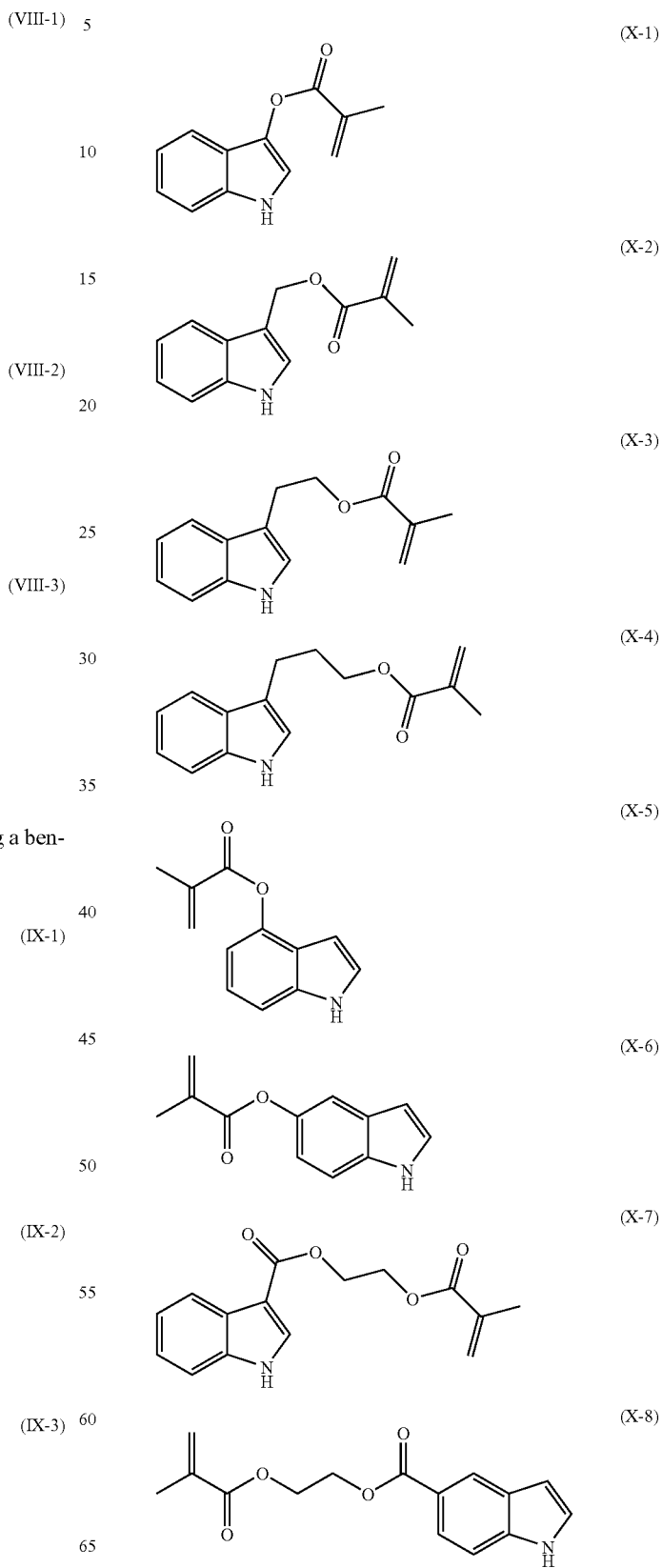
(X-1)
(X-2)
(X-3)
(X-4)
(X-5)
(X-6)
(X-7)
(X-8)

-continued
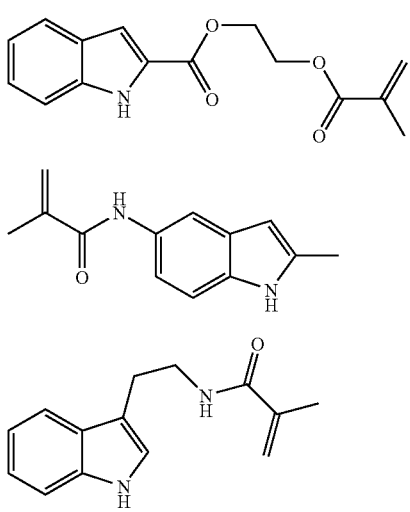
A monomer of the formula (XI-1), having a benzoxazole type fluorescent functional group:
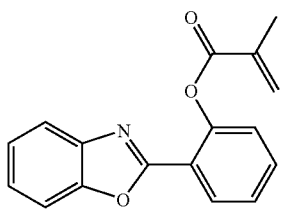
Monomers of the formulae (XII-1) to (XII-4), having a benzimidazole type fluorescent functional group:
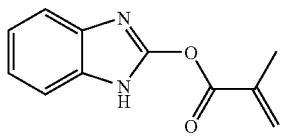
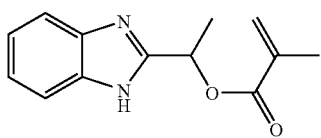
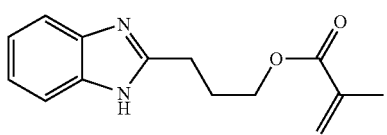
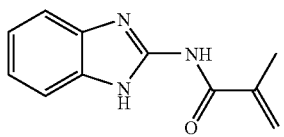
Monomers of the formulae (XIII-1) to (XIII-13), having an anthraquinone type fluorescent functional group:
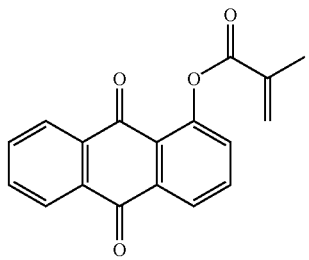
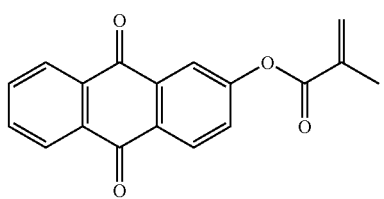
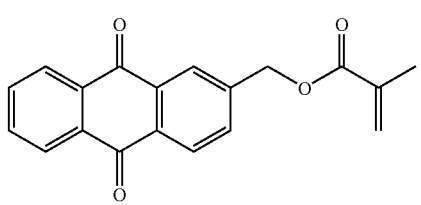
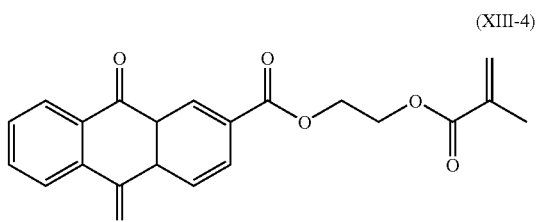
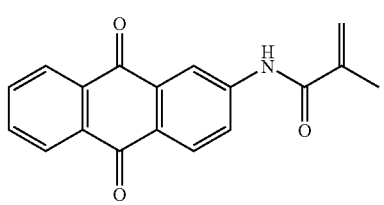
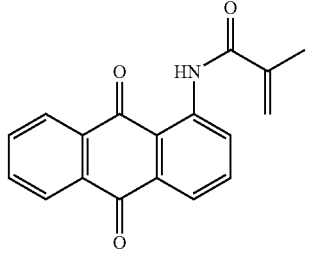

(XIII-7)
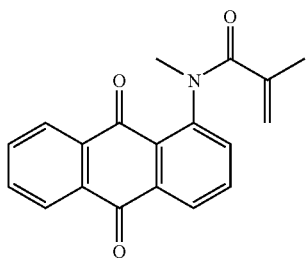
(XIII-8)
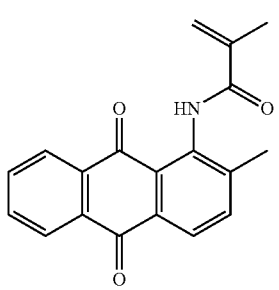
(XIII-9)
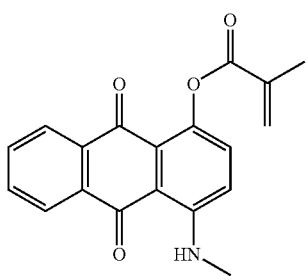
(XIII-10)
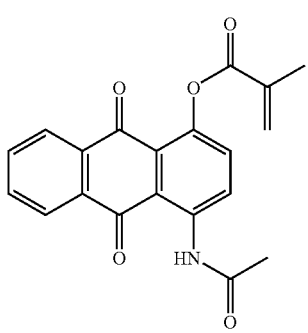
(XIII-11)
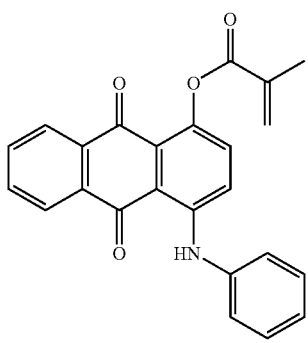
(XIII-12)
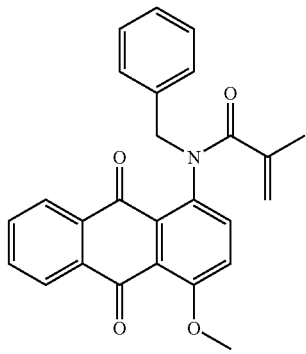
(XIII-13)
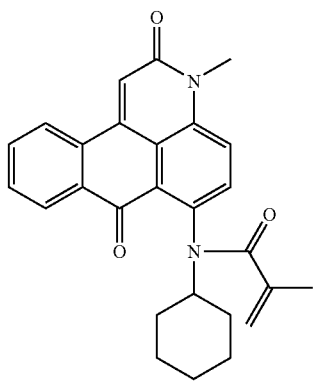
Monomers of the formulae (XIV-1) to (XIV-5), having a carbazole type fluorescent functional group:
(XIV-1)
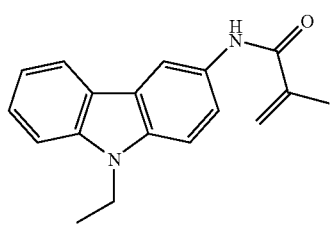
(XIV-2)
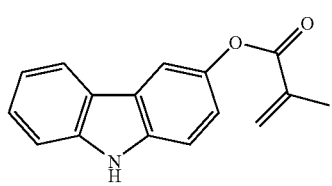
(XIV-3)
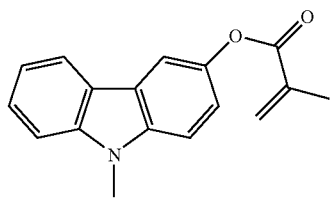

(XIV-4)
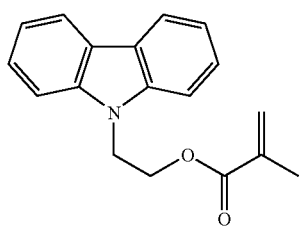
(XIV-5)
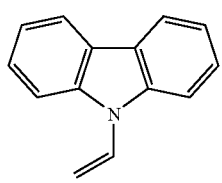
Monomers of the formulae (XV-1) to (XV-3), having an acridine type fluorescent functional group:
(XV-1)
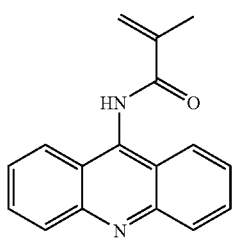
(XV-2)
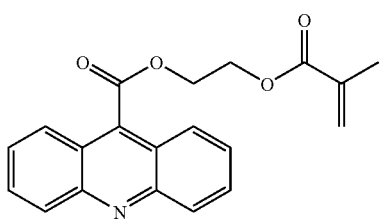
(XV-3)
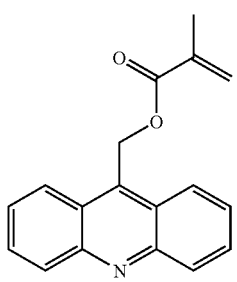
Monomers of the formulae (XVI-1) to (XVI-3), having a stilbene type fluorescent functional group:
(XVI-1)
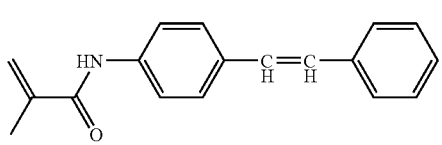
(XVI-2)
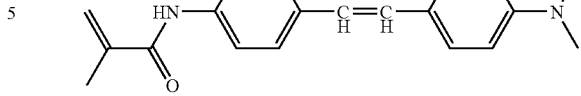
(XVI-3)
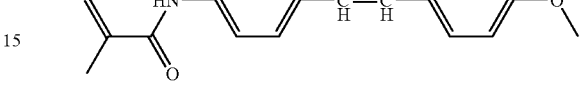
Monomers of the formulae (XVII-1) to (XVII-23), having an azo type fluorescent functional group:
(XVII-1)
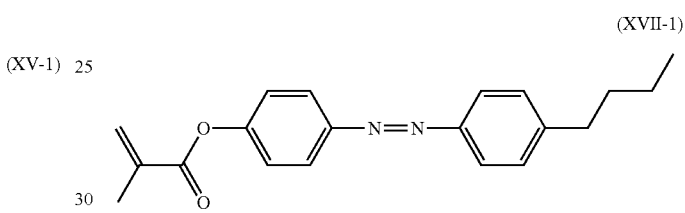
(XVII-2)
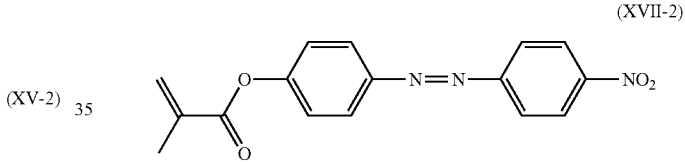
(XVII-3)
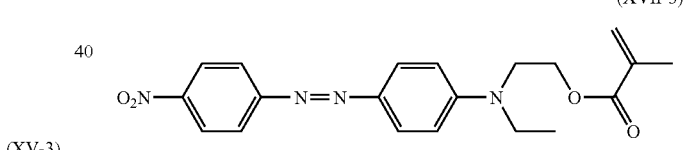
(XVII-4)
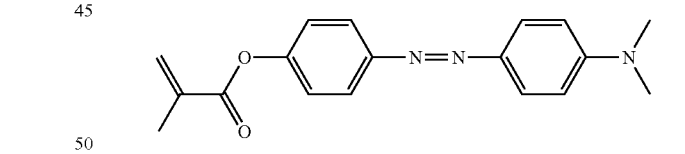
(XVII-5)
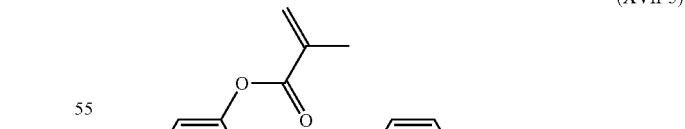
(XVII-6)
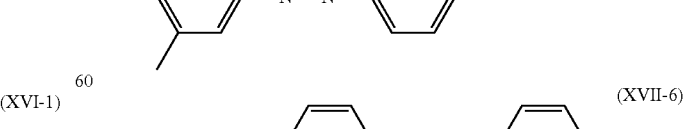

(XVII-7)
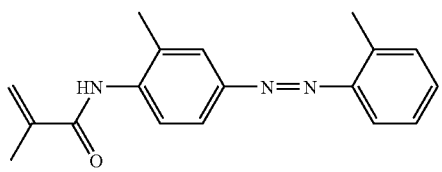
(XVII-8)
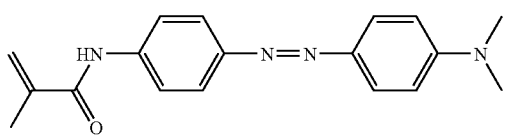
(XVII-9)
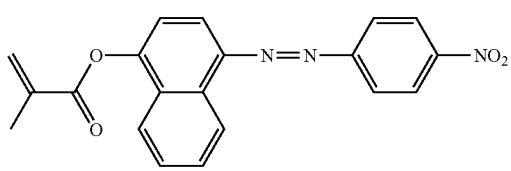
(XVII-10)
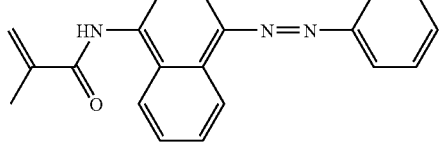
(XVII-11)
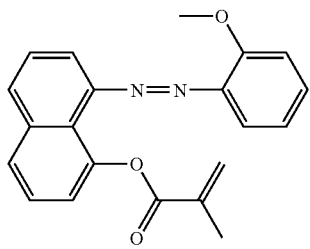
(XVII-12)
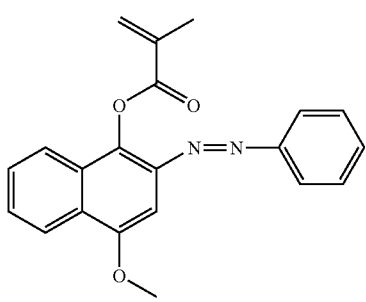
(XVII-13)
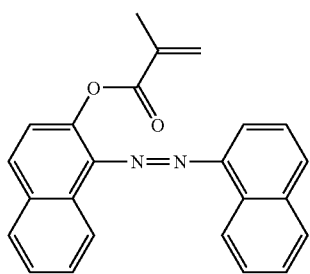
(XVII-14)
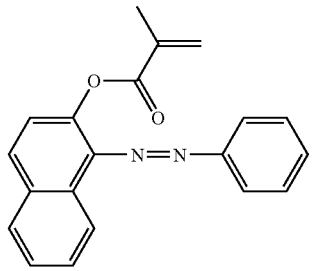
(XVII-15)
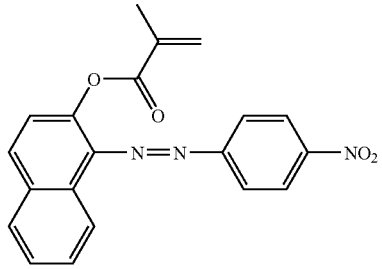
(XVII-16)
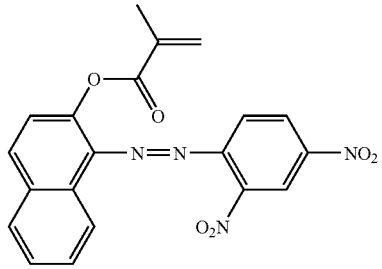
(XVII-17)
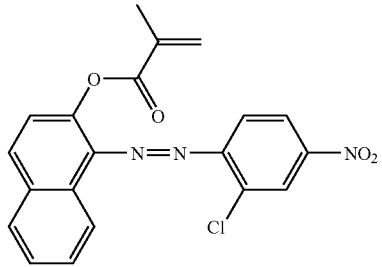
(XVII-18)
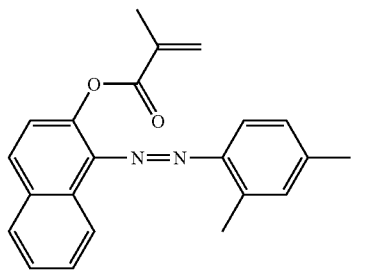
(XVII-19)
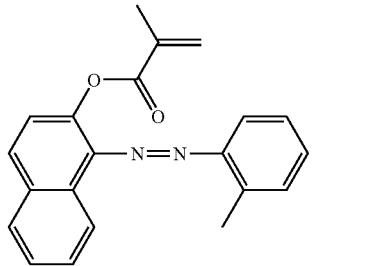

-continued
(XVII-20)
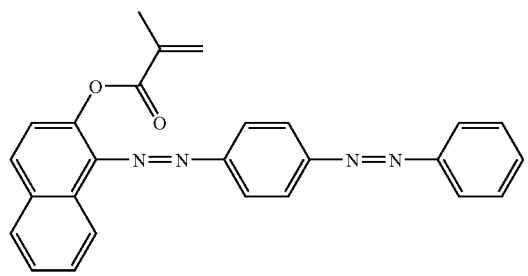
(XVII-21)
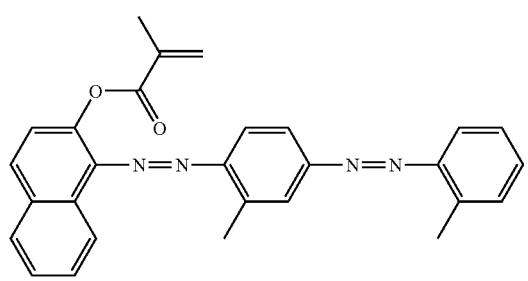
(XVII-22)
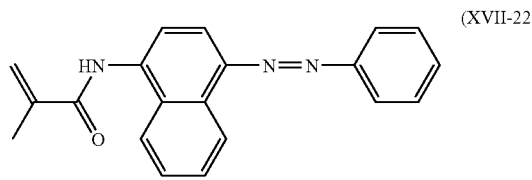
(XVII-23)
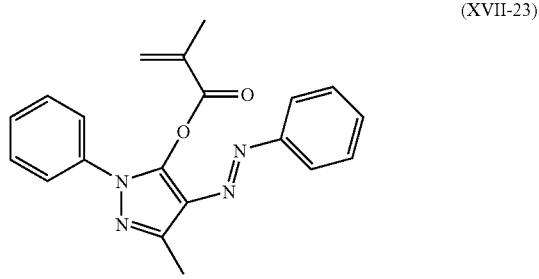
A monomer of the formula (XVIII-1), having a rhodamine type fluorescent functional group:
(XVIII-1)
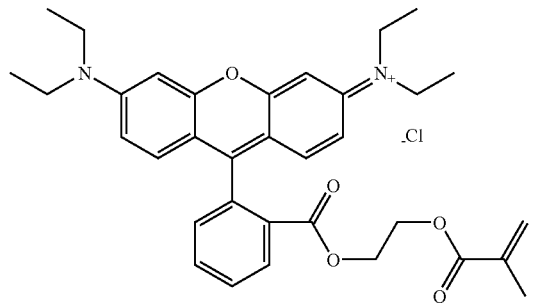
Monomers of the formulae (XIX-1) to (XIX-3), having a fluorescein type fluorescent functional group:
(XIX-1)
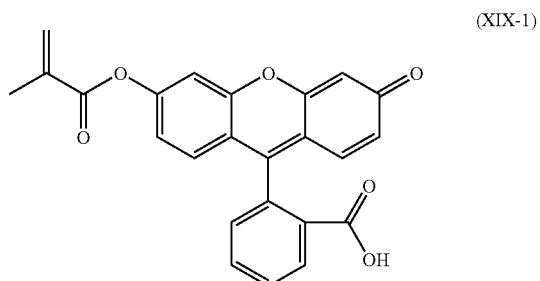
(XIX-2)
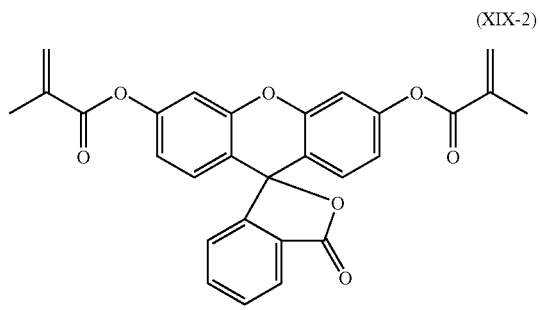
(XIX-3)
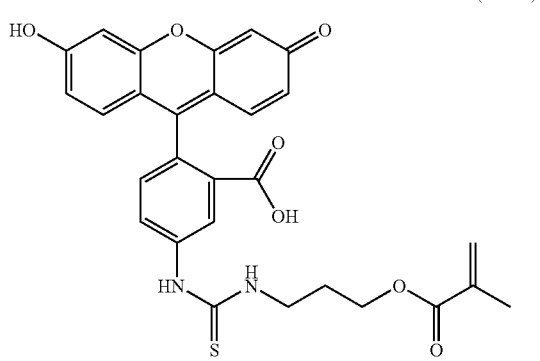
Monomers of the formulae (XX-1) to (XX-3), having a porphyrin type fluorescent functional group:
(XX-1)
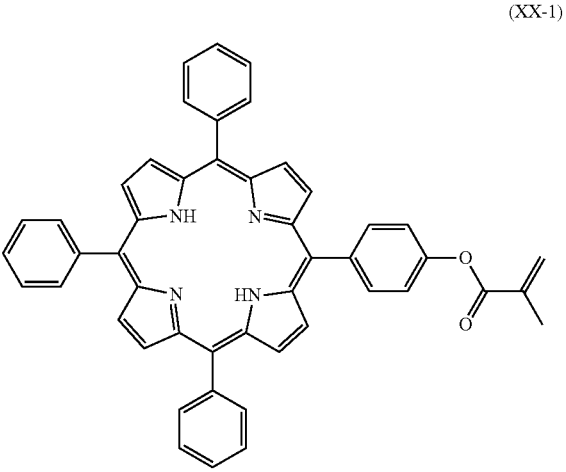

-continued (XX-2)

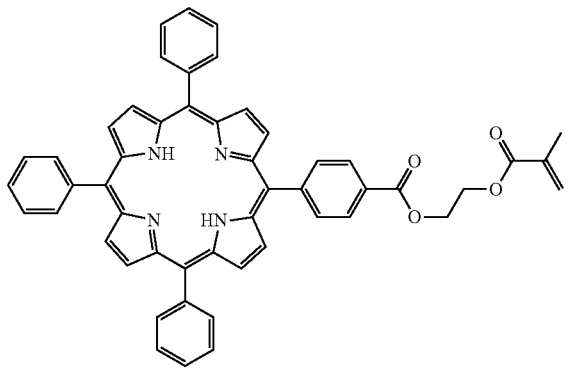

(XX-3)

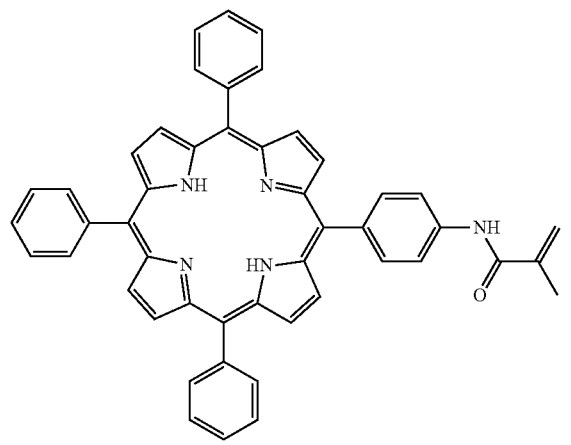

Among the above monomers, preferred is a (meth)acrylate having at least one fluorescent functional group selected from the group consisting of pyrene type, coumarin type, flavone type and benzoxazole type groups.

The repeating unit (B) contained per molecule of the oil repellent copolymer may be of one type or of two or more types.

Among all repeating units constructing the oil repellent copolymer of the present invention, the proportion of the repeating unit (B) is preferably from 0.5 to 10 mass %, more preferably from 2 to 6 mass %. When the proportion is at least 0.5 mass %, the fluorescence is excellent, and when the proportion is at most 10 mass %, the copolymer is excellent in the solubility in a solvent.

The monomer for the repeating unit (B) is easily synthesized by introducing a polymerizable group into a raw material having a reactive functional group such as a hydroxyl group, an amino group or a carboxyl group, and having a fluorescent functional group. For example, in the case of a raw material having a hydroxyl group and a fluorescent functional group, a (meth)acrylate having a fluorescent functional group can be synthesized by a dehydration condensation reaction with (meth)acrylic acid, an ester exchange reaction with a methyl(meth)acrylate, an esterification reaction using a (meth)acrylic acid anhydride, or an esterification reaction using a (meth)acrylic acid halide. In the case of a raw material having an amino group and a fluorescent functional group, a (meth)acrylamido having a fluorescent functional group can be synthesized by a dehydration condensation reaction with (meth)acrylic acid, an ester-amido exchange reaction with methyl (meth)acrylate, an amidation reaction using a (meth) acrylic acid anhydride, or an amidication reaction using a (meth)acrylic acid halide. In the case of a raw material having a carboxyl group and a fluorescent functional group, a polymerizable functional group can be introduced by an esterification reaction with a monomer having a hydroxyl group, such as 2-hydroxyethyl methacrylate.

Repeating Unit (C)

The repeating unit (C) is derived from a monomer which not only has a polar group selected from an ester bond other than an ester bond derived from acrylic acid and a hydroxyl group but also has a polymerizable group.

The "ester bond derived from acrylic acid" is specifically an ester bond (—COO—) derived from a carboxyl group (—COOH) of acrylic acid ($CH_2$=CHCOOH), or an ester bond (—COO—) derived from a carboxyl group (—COOH) of methacrylic acid ($CH_2$=C($CH_3$)COOH).

The polymerizable group is not particularly limited, but a (meth)acryloyl group is preferred from the viewpoint of copolymerizability. That is, the repeating unit (C) is preferably derived from a "(meth)acrylate having an ester bond other than an ester bond derived from acrylic acid, and/or a hydroxyl group" wherein the hydrogen atom of a carboxyl group of (meth)acrylic acid is substituted by a group having an ester bond other than an ester bond derived from acrylic acid, and/or a hydroxyl group.

The (meth)acrylate having a hydroxyl group may, for example, be 2-hydroxyethyl (meth)acrylate, 2-hydroxypropyl (meth)acrylate, 4-hydroxybutyl (meth)acrylate, 1,4-cyclohexanedimethanol mono(meth)acrylate, 3-chloro-2-hydroxypropyl (meth)acrylate, a polyoxyalkylene mono(meth)acrylate, a polyoxyethylene mono(meth)acrylate, a polyoxypropylene mono(meth)acrylate or a polyoxyethylenepolyoxypropylene mono(meth)acrylate.

The (meth)acrylate having an ester bond other than an ester bond derived from acrylic acid may, for example, be α-methacryloxy-γ-butylolactone (hereinafter sometimes referred to as GBLMA).

The (meth)acrylate having both an ester bond other than an ester bond derived from acrylic acid, and a hydroxyl group, may, for example, be 2-acryloyloxyethyl-2-hydroxyethyl phthalate, mono(methacryloyloxyethyl) succinate, or a monomer having ε-caprolactone ring-opened by a "2-hydroxyethylmethacrylate" to add from 1 to 10 mol (tradename: PLACCEL manufactured by Daicel Chemical Industries, LTD.).

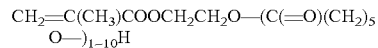

$CH_2$=C($CH_3$)COOCH$_2$CH$_2$O—(C(=O)(CH$_2$)$_5$O—)$_{1-10}$H (i)

The repeating unit (C) contained per molecule of the oil repellent copolymer may be of one type or of two or more types. A monomer for the repeating unit (C) is available from commercial products.

Among all repeating units constituting the oil repellent copolymer of the present invention, the proportion of the repeating unit (C) is preferably from 0.5 to 20 mass %, more preferably from 2 to 10 mass %. When the proportion is at least 0.5 mass %, the obtained oil repellent film is excellent in durability, and when the proportion is at most 20 mass %, the copolymer is excellent in solubility in a solvent.

Further, when the repeating unit (C) having a polar group is present in the oil repellent copolymer, it is considered that the polar group interacts with a substrate, whereby adhesion between the substrate and the oil repellent film can be improved. For example, it is considered that when the substrate is a metal, an oxygen atom of the polar group contributes to the interaction, and when the substrate is a plastic, an ester group contributes to the interaction, whereby adhesion between the oil repellent film and the substrate is improved.

Repeating Unit (D)

The repeating unit (D) is derived from a monomer which not only has an isocyanate group or a blocked isocyanate group but also has a polymerizable group.

The polymerizable group is not particularly limited, but a (meth)acryloyl group is preferred from the viewpoint of copolymerizability. That is, the repeating unit (D) is preferably derived from a "(meth)acrylate having an isocyanate group or a blocked isocyanate group" wherein the hydrogen atom of a carboxyl group of (meth)acrylic acid is substituted by a group having an isocyanate group or a blocked isocyanate group.

The (meth)acrylate having an isocyanate group may, for example, be 2-isocyanatoethyl (meth)acrylate or 1,3,3-trimethyl-4-isocyanatocyclohexylmethylamidooxyethyl (meth)acrylate.

A blocking agent used for blocking the isocyanate group may, for example, be 2-butanone oxime, cyclohexanone oxime, ε-caprolactam, ethyl acetoacetate, acetyl acetone, phenol, methanol, diethyl malonate, bisulfite, pyrazole, 3-methylpyrazole, 3,5-dimethylpyrazole or indazole. Among these blocking agents, since stability and reactivity are excellent, more preferred is 2-butanone oxime, ethyl acetoacetate, diethyl malonate, pyrazole, 3-methylpyrazole or 3,5-dimethylpyrazole, and most preferred is 2-butanone oxime, 3-methylpyrazole or 3,5-dimethylpyrazole.

When the repeating unit (D) is present in the oil repellent copolymer, a repeating unit (C1) having a hydroxyl group is used as a part or all of the repeating unit (C) constituting the oil repellent copolymer. The repeating unit (C1) should have at least a hydroxyl group, and may have not only a hydroxyl group but also an ester bond other than an ester bond derived from acrylic acid. The repeating unit (C1) and the repeating unit (D) are considered to react with each other.

The repeating unit (D) contained per molecule of the oil repellent copolymer may be of one type or of two or more types. A monomer for the repeating unit (D) is available from commercial products.

When the repeating unit (D) is present in the oil repellent copolymer of the present invention, among all repeating units constructing the oil repellent copolymer, the proportion of the repeating unit (D) is preferably from 0.1 to 5 mass %, more preferably from 0.5 to 2 mass %. When the proportion is at least 0.1 mass %, the obtained oil repellent film is excellent in durability, and when the proportion is at most 5 mass %, the copolymer solution is excellent in storage stability.

Further, in this case, among all repeating units constructing the oil repellent copolymer, the proportion of the repeating unit (C1) having a hydroxyl group is preferably from 0.1 to 20 mass %, more preferably from 0.5 to 10 mass %. When the proportion is at least 0.1 mass %, the obtained oil repellent film is excellent in durability, and when the proportion is at most 20 mass %, the copolymer solution is excellent in storage stability.

Repeating Unit (E)

The repeating unit (E) is derived from a monomer which not only has a linear alkyl group having at least 10 carbon atoms but also has a polymerizable group. In the present invention, other than a linear alkyl group having at least 10 carbon atoms, the repeating unit (E) does not contain a repeating unit having at least one member selected from the group consisting of a polyfluoroalkyl group, a fluorescent functional group, an ester bond other than an ester bond derived from acrylic acid, a hydroxyl group, an isocyanate group and a blocked isocyanate group.

That is, other than a linear alkyl group having at least 10 carbon atoms, one having a polyfluoroalkyl group is the repeating unit (A), one having a fluorescent functional group is the repeating unit (B), one having an ester bond other than an ester bond derived from acrylic acid, and/or a hydroxyl group is the repeating unit (C), and one having an isocyanate group or a blocked isocyanate group is the repeating unit (D).

The polymerizable group of the repeating unit (E) is not particularly limited, but a (meth)acryloyl group is preferred from the viewpoint of copolymerizability. That is, the repeating unit (E) is preferably derived from a "(meth)acrylate having a linear alkyl group having at least 10 carbon atoms" wherein the hydrogen atom of a carboxyl group of (meth)acrylic acid is substituted by a group having a linear alkyl group having at least 10 carbon atoms.

The upper limit of the number of carbon atoms of the linear alkyl group in the repeating unit (E) is not particularly limited, but at most 25 is preferred from the viewpoint of availability. The number of carbon atoms of the linear alkyl group is preferably from 10 to 20, more preferably from 14 to 20.

The repeating unit (E) contained per molecule of the oil repellent copolymer may be of one type or of two or more types. A monomer for the repeating unit (E) is available from commercial products.

When the repeating unit (E) is present in the oil repellent copolymer of the present invention, among all repeating units constituting the oil repellent copolymer, the proportion of the repeating unit (E) is preferably from 0.1 to 5 mass %, more preferably from 0.5 to 2 mass %. When the proportion is at least 0.1 mass %, the film forming property is excellent, and when the proportion is at most 5 mass %, the oil repellency is excellently realized.

Method for Production

The oil repellent copolymer of the present invention is produced by polymerizing monomers for the respective repeating units.

Specifically, preferred is a method having a step of polymerizing a monomer raw material comprising a monomer for the repeating unit (A), a monomer for the repeating unit (B) and a monomer for the repeating unit (C), in a solvent (polymerization solvent) in the presence of a polymerization initiator. The monomer raw material may, further contain a monomer for the repeating unit (D) and/or a monomer for the repeating unit (E), as the case requires.

It is preferred to use a (meth)acrylate having a polyfluoroalkyl group as the monomer for the repeating unit (A), to use a (meth)acrylate having a fluorescent functional group as the monomer for the repeating unit (B), and to use a (meth)acrylate having an ester bond other than an ester bond derived from acrylic acid, and/or a hydroxyl group as the monomer for the repeating unit (C). Further, it is preferred to use a (meth)acrylate having an isocyanate group or a blocked isocyanate group as the monomer for the repeating unit (D), and to use a (meth)acrylate having a linear alkyl group having at least 10 carbon atoms as the monomer for the repeating unit (E).

As the polymerization method, an ion polymerization method, a radical polymerization method or the like may be used. Particularly, the radical polymerization method is preferred in that polymerization can thereby be carried out under a mild condition by using a radical initiator as the polymerization initiator. Specifically, the radical polymerization can be carried out by such a polymerization method as suspension polymerization, solution polymerization, bulk polymerization or emulsion polymerization.

As the radical initiator, a water-soluble initiator or an oil-soluble initiator is used depending on the particular polymerization method. For example, in emulsion polymerization, a water-soluble peroxide is preferably used as the initiator. Specifically, the water-soluble peroxide may, for example, be potassium persulfate, ammonium persulfate or disuccinic peroxide. In suspension polymerization, solution polymerization or bulk polymerization, as the initiator, a non-fluorinated peroxide, a fluorinated peroxide or an azo compound is preferably used.

As specific examples of these initiators, diisopropylperoxy dicarbonate, benzoyl peroxide, perfluorobutanoic acid peroxide, 2,2'-azobis(isobutyronitrile), 2,2'-azobis(2-methylbutyronitrile), 2,2'-azobis(2,4-dimethylvaleronitrile) and dimethyl 2,2'-azobis(2-methylpropyonate) may preferably be used.

Polymerization Solvent

As a solvent to be used for the polymerization reaction, (X1) a halogen compound, (X2) a hydrocarbon, (X3) a ketone, (X4) an ester, (X5) an ether, (X6) a nitrogen compound, (X7) a sulfur compound, (X8) an inorganic solvent or (X9) an organic acid may be mentioned.

(X1) The halogen compound may, for example, be (X11) a halogenated hydrocarbon or (X12) a halogenated ether.

(X11) The halogenated hydrocarbon may, for example, be (X111) a hydrochlorofluorocarbon, (X112) a hydrofluorocarbon, (X113) a fluorinated alcohol or (X114) a hydrobromocarbon.

(X111) The hydrochlorofluorocarbon may be the following compounds:
$CH_3CCl_2F$,
$CHCl_2CF_2CF_3$,
$CHClFCF_2CClF_2$, etc.

(X112) The hydrofluorocarbon may be the following compounds:
$CF_3CF_2CF_2CHF_2$,
$CF_3CF_2CF_2CH_2F$,
$CF_3CF_2CH_2CF_3$,
$CHF_2CF_2CF_2CHF_2$,
$CHF_2CH_2CF_2CF_3$,
$CF_3CHFCH_2CF_3$,
$CF_3CH_2CF_2CHF_2$,
$CHF_2CHFCF_2CHF_2$,
$CF_3CHFCF_2CH_3$,
$CHF_2CHFCHFCHF_2$,
$CF_3CH_2CF_2CH_3$,
$CF_3CF_2CH_2CH_3$,
$CHF_2CH_2CF_2CH_3$,
$CHF_2CF_2CF_2CF_2CF_3$,
$CF_3CF_2CF_2CHFCF_3$,
$CHF_2CF_2CF_2CF_2CHF_2$,
$CF_3CHFCHFCF_2CF_3$,
$CF_3CHFCF_2CH_2CF_3$,
$CF_3CF(CF_3)CF_2CHF_2$,
$CF_3CH(CF_3)CH_2CF_3$,
$CF_3CH_2CF_2CH_2CF_3$,
$CHF_2CHFCF_2CHFCHF_2$,
$CHF_2CF_2CF_2CHFCH_3$,
$CF_3CH_2CH_2CH_2CF_3$,
$CHF_2CH_2CF_2CH_2CHF_2$,
$CF_3(CF_2)_4CHF_2$,
$CF_3(CF_2)_4CH_2F$,
$CF_3CF_2CF_2CF_2CH_2CF_3$,
$CHF_2CF_2CF_2CF_2CF_2CHF_2$,
$CF_3CH(CF_3)CHFCF_2CF_3$,
$CF_3CF_2CH_2CH(CF_3)CF_3$,
$CF_3CH_2CF_2CF_2CH_2CF_3$,
$CF_3CF_2CH_2CH_2CF_2CF_3$,
$CF_3CF_2CF_2CF_2CH_2CH_3$,
$CF_3CF_2CF_2CF_2CF_2CH_2CH_3$,
$CF_3CH(CF_3)CH_2CH_2CF_3$,
$CHF_2CF_2CH_2CH_2CF_2CHF_2$
$CF_3CF_2CF_2CH_2CH_2CH_3$, etc.

(X113) The fluorinated alcohol may, for example, be trifluoroethanol, 2,2,3,3,3-pentafluoro-1-propanol, 2-(pentafluorobutyl)ethanol, 2-(perfluoropentyl)ethanol, 2-(perfluorohexyl)ethanol, 2-(perfluorooctyl)ethanol, 2-(perfluorodecyl)ethanol, 2-(perfluoro-3-methylbutyl)ethanol, 1H,1H,3H-tetrafluoro-1-propanol, 1H,1H,5H-octafluoro-1-heptanol, 1H,1H,9H-hexadecafluoro-1-nonanol, 2H-hexafluoro-2-2-propanol or 1H, 1H,3H-hexafluoro-2-butanol.

(X114) The hydrobromocarbon may be the following compounds:
$CH_2Br_2$,
$CH_2BrCH_2CH_3$,
$CH_3CHBrCH_3$,
$CH_2BrCHBrCH_3$, etc.

(X12) The halogenated ether may, for example, be (X121) a hydrofluoroether.

(X121) The hydrofluoroether may, for example, be (X1211) a separate type hydrofluoroether or (X1212) a non-separate type hydrofluoroether. (X1211) The separate type hydrofluoroether is a compound wherein a perfluoroalkyl group or a perfluoroalkylene group, and an alkyl group or an alkylene group, are bonded via an etheric oxygen atom. (X1212) The non-separate type hydrofluoroether is a hydrofluoroether containing a partially fluorinated alkyl or alkylene group.

(X1211) The separate type hydrofluoroether may be the following compounds:
$CF_3CF_2CF_2OCH_3$,
$(CF_3)_2CFOCH_3$,
$CF_3CF_2CF_2OCH_2CH_3$,
$CF_3CF_2CF_2CF_2OCH_3$,
$(CF_3)_2CFCF_2OCH_3$,
$(CF_3)_3COCH_3$,
$CF_3CF_2CF_2CF_2OCH_2CH_3$,
$(CF_3)_2CFCF_2OCH_2CH_3$,
$(CF_3)_3COCH_2CH_3$,
$CF_3CF_2CF(OCH_3)CF(CF_3)_2$,
$CF_3CF_2CF(OCH_2CH_3)CF(CF_3)_2$,
$C_5F_{11}OCH_2CH_3$,
$CF_3CF_2CF_2CF(OCH_2CH_3)CF(CF_3)_2$,
$CF_3O(CF_2)_4OCH_3$,
$CH_3OCF_2CF_2OCH_2CH_3$,
$C_3H_7OCF(CF_3)CF_2OCH_3$,
$F(CF_2)_nOCH_3$ (n is from 6 to 10.), etc.

(X1212) The non-separate type hydrofluoroether may be the following compounds:
$CHF_2OCF_2OCHF_2$,
$CH_2FCF_2OCHF_2$,
$CF_3CF_2CF_2OCH_2F$,
$CF_3CF_2OCH_2CHF_2$,
$CHF_2CF_2OCH_2CF_3$,
$CHF_2CF_2CH_2OCF_3$,
$CF_3CF_2CH_2OCHF_2$,
$CHF_2CF_2OCH_2CHF_2$,
$CF_3CH_2OCF_2CHF_2$,
$CF_3CH_2OCF_2CHF_2$,
$CHF_2CF_2CF_2OCH_3$,
$CHF_2CF_2CH_2OCH_3$, $CF_3CF_2CF_2OCH_2CF_3$,
$CF_3CF_2CH_2OCF_2CF_3$,
$CF_3CF_2CF_2OCH_2CHF_2$,
$CF_3CF_2CH_2OCF_2CHF_2$,
$CHF_2CF_2CH_2OCF_2CF_3$,
$CHF_2CF_2CH_2OCF_2CHF_2$,
$CF_3CHFCF_2CH_2OCF_3$,
$CF_3CHFCF_2CH_2OCHF_2$,
$CF_3CF_2CF_2CH_2OCH_3$,
$(CF_3)_2CHCF_2OCH_3$,
$CF_3CF_2CF_2OCH_2CF_2CF_3$,
$CF_3CF_2CF_2OCH_2CF_2CHF_2$,
$CF_3CF_2CF_2CF_2OCF_2CHF_2$,
$CF_3(CF_2)_5OCHF_2$,
$CHF_2OCF_2CF_2OCHF_2$,
$CHF_2OCF_2OCF_2CF_2OCHF_2$,
$CHF_2OCF_2OCF_2OCF_2OCHF_2$, etc.

(X2) The hydrocarbon may, for example, be (X21) an aliphatic hydrocarbon, (X22) an alicyclic hydrocarbon or (X23) an aromatic hydrocarbon.

(X21) The aliphatic hydrocarbon may, for example, be pentane, 2-methylbutane, 3-methylpentane, hexane, 2,2-dimethylbutane, 2,3-dimethylbutane, heptane, octane, 2,2,4-trimethylpentane, 2,2,3-trimethylhexane, decane, undecane, dodecane, 2,2,4,6,6-pentamethylheptane, tridecane, tetradecane or hexadecane.

(X22) The alicyclic hydrocarbon may, for example, be cyclopentane, methylcyclopentane, cyclohexane, methylcyclohexane or ethylcyclohexane.

(X23) The aromatic hydrocarbon may, for example, be benzene, toluene or xylene.

(X3) The ketone may, for example, be acetone, methyl ethyl ketone, 2-pentanone, 3-pentanone, 2-hexanone or methyl isobutyl ketone.

(X4) The ester may, for example, be methyl acetate, ethyl acetate, butyl acetate, methyl propionate, methyl lactate, ethyl lactate or pentyl lactate.

(X5) The ether may, for example, be diisopropyl ether, dioxane or tetrahydrofuran.

(X6) The nitrogen compound may, for example, be pyridine, N,N-dimethylformamide, N,N-dimethylacetamide or N-methylpyrrolidone.

(X7) The sulfur compound may, for example, be dimethylsulfoxide or sulfolane.

(X8) The inorganic solvent may, for example, be liquid carbon dioxide.

(X9) The organic acid may, for example, be acetic acid, propionic acid, malic acid or lactic acid.

From the viewpoint of solubility, the solvent is preferably (X111) the hydrochlorofluorocarbon, (X112) the hydrofluorocarbon or (X121) the hydrofluoroether, more preferably $CH_3CCl_2F$, $CHCl_2CF_2CF_3$, $CHClFCF_2CClF_2$, $CH_2FCF_2OCHF_2$, $CF_3CF_2CF_2OCH_2F$, $CF_3CF_2OCH_2CHF_2$, $CHF_2CF_2OCH_2CF_3$, $CHF_2CF_2CH_2OCF_3$, $CF_3CF_2CH_2OCHF_2$, $CHF_2CF_2OCH_2CHF_2$, $CF_3CH_2OCF_2CH_2F$, $CF_3CH_2OCF_2CHF_2$, $CHF_2CF_2CF_2OCH_3$, $CF_3(CF_2)_4CHF_2$, $CF_3(CF_2)_4CH_2F$, $CF_3(CF_2)_5OCH_3$ or $CF_3CF_2CF_2CF_2CF_2CH_2CH_3$. With these solvents, the copolymer is excellent in solubility and storage stability in its solution state. The solvents may be used alone or as a mixture of two or more of them.

Thus, the monomer is subjected to a polymerization reaction in such a polymerization solvent to obtain a reaction solution containing the formed oil repellent copolymer and the polymerization solvent.

The mass average molecular weight (molecular weight calculated as polystyrene by gel permeation chromatography (GPC), the same applies hereinafter) of the oil repellent copolymer of the present invention is preferably from 10,000 to 500,000, more preferably from 30,000 to 100,000. When the molecular weight is at least 10,000, the oil repellent film thereby obtainable will be excellent in durability, and when the molecular weight is at most 500,000, the solubility in a solvent will be excellent.

Oil Repellent Treatment Solution

The oil repellent treatment solution of the present invention comprises the oil repellent copolymer of the present invention and a fluorinated solvent. As the fluorinated solvent, (X111) the hydrochlorofluorocarbon, (X112) the hydrofluorocarbon, (X113) the fluorinated alcohol, (X121) the hydrofluoroether or a perfluorocarbon, which are mentioned above as examples of the polymerization solvent, can be suitably used.

Among them, more preferable ones are the same as the above mentioned more preferable ones as the polymerization solvent. Further, the perfluorocarbon is also preferred.

When a fluorinated solvent is contained in the oil repellent treatment solution of the present invention, the oil repellent copolymer is excellent in solubility and the oil repellent treatment solution is excellent in storage stability. The fluorinated solvents may be used alone or in combination as a mixture of two or more of them.

The oil repellent treatment solution can be obtained by diluting the reaction solution obtained by the polymerization reaction, with the fluorinated solvent. The polymerization solvent in the reaction solution may be the same as or different from the fluorinated solvent used for dilution.

Otherwise, the oil repellent treatment solution may be prepared by a method wherein from the reaction solution obtained by the polymerization reaction, the oil repellent copolymer is once recovered by e.g. reprecipitation, and then, it is re-dissolved in a solvent containing a fluorinated solvent.

The proportion of the oil repellent copolymer in the oil repellent treatment solution of the present invention is preferably from 0.1 to 20 mass %, more preferably from 0.1 to 10 mass %, per 100 mass % of the oil repellent treatment solution. Further, the proportion of the solvent is preferably from 80 to 99.9 mass %, more preferably from 90 to 99.9 mass %, per 100 mass % of the oil repellent treatment solution. When the proportion of the solvent is from 80 to 99.9 mass %, the oil repellent treatment solution is excellent in storage stability, and it is preferred that a film is formed by one coating operation.

The solvent in the oil repellent treatment solution may contain other solvents other than the fluorinated solvent. The proportion of the fluorinated solvent in the solvent in the oil repellent treatment solution is preferably at least 60 mass %, more preferably at least 80 mass %, most preferably 100 mass %.

Oil Repellent Film

An oil repellent film can be formed by using the oil repellent treatment solution of the present invention.

Specifically, the oil repellent treatment solution is coated on a substrate, and the solvent is evaporated to form a film. The coating method may, for example, be spray-coating, dipping, brush-coating, potting or spin-coating.

Otherwise, the oil repellent treatment solution may be mixed to a coating agent or an ink of portable type such as a spray can and then applied on a substrate.

When the oil repellent film is to be formed, it is preferred to apply heating in order to dry the solvent in the oil repellent treatment solution as well as to promote the curing of the film. The temperature for heating is preferably from 70 to 180° C., more preferably from 80 to 150° C. The time for heating is preferably at least 30 minutes. When the repeating unit (D)

has a blocked isocyanate group, heating is carried out at a temperature of at least such a level that the blocking agent will be dissociated.

When the heating conditions are within the above ranges, the functional group will be excellent in curing properties, the film will be excellently cured, and a chemical bond and an anchor bond with a substrate will be promoted, whereby an oil repellent film excellent in oil repellency will be obtained.

The oil repellent film formed by using the oil repellent treatment solution of the present invention is excellent in visibility, since the oil repellent copolymer, which is a film forming component, has a fluorescent functional group.

For example, the oil repellent film is irradiated with a light ray having a wavelength, to which the fluorescent functional group in the oil repellent copolymer has sensitivity, to let the fluorescent functional group emit fluorescence, whereby visibility will be obtained.

Further, the oil repellent film formed by using the oil repellent treatment solution of the present invention is excellent in adhesion with a substrate and in durability. Specifically, as shown in the following Examples, the visibility and oil repellency are excellently maintained even when it is contacted with a solvent.

In the present invention, the oil repellent copolymer comprises the repeating unit (A) having a polyfluoroalkyl group, the repeating unit (B) having a fluorescent functional group, and the repeating unit (C) having an ester bond other than an ester bond derived from acrylic acid, and/or a hydroxyl group, whereby it is considered possible to improve adhesion between the film and the substrate without impairing the oil repellency and the fluorescence, which the film itself has.

Further, in the oil repellent copolymer, a part or all of the repeating unit (C) is made to be a repeating unit having a hydroxyl group, and further the repeating unit (D) having an isocyanate group or a blocked isocyanate group is incorporated, to let the repeating unit (C) and the repeating unit (D) crosslink to each other during forming a film to produce a film in which a solvent is hardly penetrated, whereby the durability can be further improved.

Further, to the oil repellent copolymer, the repeating unit (E) having a linear alkyl group having at least 10 carbon atoms is further incorporated, whereby the dynamic oil repellency of the film is improved. When the dynamic oil repellency is high, an advantage is obtained, for example, such that when it is immersed in an organic solvent and pulled out, the organic solvent tends to slip down easily and not to remain on the film.

Applications

The film formed by the oil repellent treatment solution of the present invention is suitable for, for example, the following applications:

Oil seal of bearing; oil seal of a fan motor FDB for cooling LED back light; prevention of oil dispersion of a print substrate; moisture proof, antifouling or corrosion resistance for a product in a process of semiconductor e.g. a semiconductor substrate or wafer; prevention of leakage of micro bearing lubricant grease; prevention of dispersion of micro motor lubricant oil; prevention of dispersion of oil for watch components; prevention of dispersion of oil for a sliding portions of various lenses; prevention of stain on a magnetic head; prevention of creeping flux; lubrication of a voice coil motor for HDD; antifouling or moisture proof for a microscope lens; antifouling for a mirror, antifouling for a display screen; antifouling, moisture proof or releasing for an exposure mask or a photo mask; antifouling and moisture proof for glass lenses; antifouling or moisture proof for a camera lens; antifouling, corrosion resistance or moisture proof for optical components of e.g. window materials; antifouling or oil repellency for a filter for pressure difference adjustment of e.g. a camera or a portable phone; antifouling for filter material of an air filter for a cleaner; oil repellency or antifouling for an air flow filter e.g. an air flow filter for a vehicle; lubrication, antifouling, oil repellency or waterproof for rolling components e.g. a roll belt, a printer roll, a rolling roller or a motor fan; antifouling, waterproof, releasing or surface reform for a device e.g. a micro reactor channel, a slide type bubble device or a mold; antifouling, oil repellency or waterproof for kitchen supplies materials e.g. a range food, a gas stove or an oil dispersion prevention sheet for of a gas range; oil repellency or antifouling for an exhausted gas filter; moisture proof or anticorrosion for a lead wire; oil repellency and antifouling for bearing or a gear; antifouling, oil repellency or waterproof for a nozzle of a coating head; antifouling or oil repellency for materials of stationeries; water and oil repellency or antifouling for a carpet; anticorrosion or waterproof of a filament; water and oil repellency for clothing; antifouling or oil repellency for a show window; oil repellency for papers for inkjet; surface reform for cosmetics; antifouling or oil repellency for an inkjet nozzle; antifouling or oil repellency for a metal plate; water and oil repellency for sealing agents for packing materials for foods; antifouling for an indicator; oil repellency or antifouling for a separation membrane for fuel battery; oil repellency for an insulation spacer; antifouling or waterproof for a film glove; antifouling or oil repellency for a fuel tank; antifouling or water and oil repellency for a stone material e.g. a gravestone or a stone monument; and antifouling or water and oil repellency for e.g. wall materials, architectural materials, wood or tiles.

EXAMPLES

Now, the present invention will be described in further detail with reference to Examples and Comparative Examples. However, the present invention is by no means restricted thereto.

Table 1 shows monomers used for preparation of oil repellent treatment solutions. The monomers A to E are, respectively, monomers for the constituting units A to E.

TABLE 1

| Monomer A | $F(CF_2)_6 CH_2 CH_2 OCOC(CH_3)=CH_2$ |
|---|---|
| Monomer B | |
| FM1 | 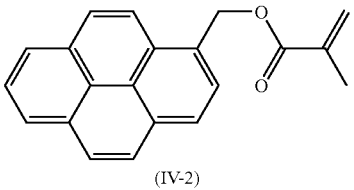 |

(IV-2)

TABLE 1-continued
FM2
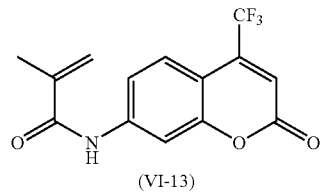
(VI-13)
FM3
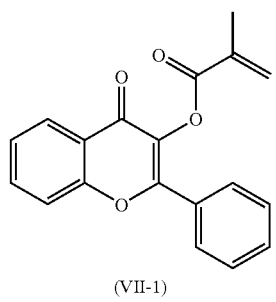
(VII-1)
FM4
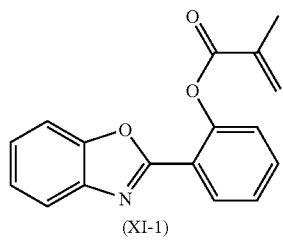
(XI-1)
FM5
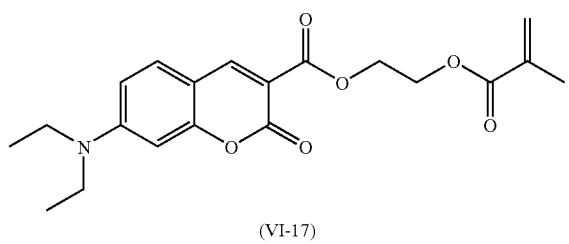
(VI-17)
FM6
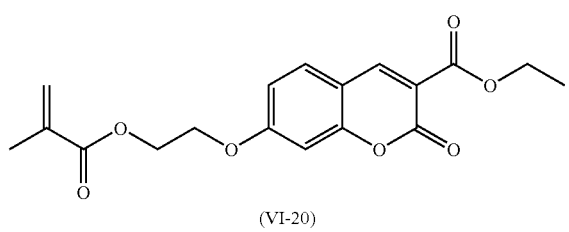
(VI-20)
Monomer C
M1
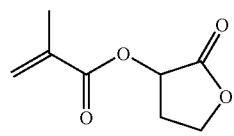
M2
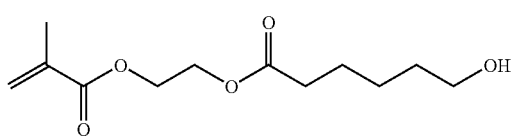

TABLE 1-continued

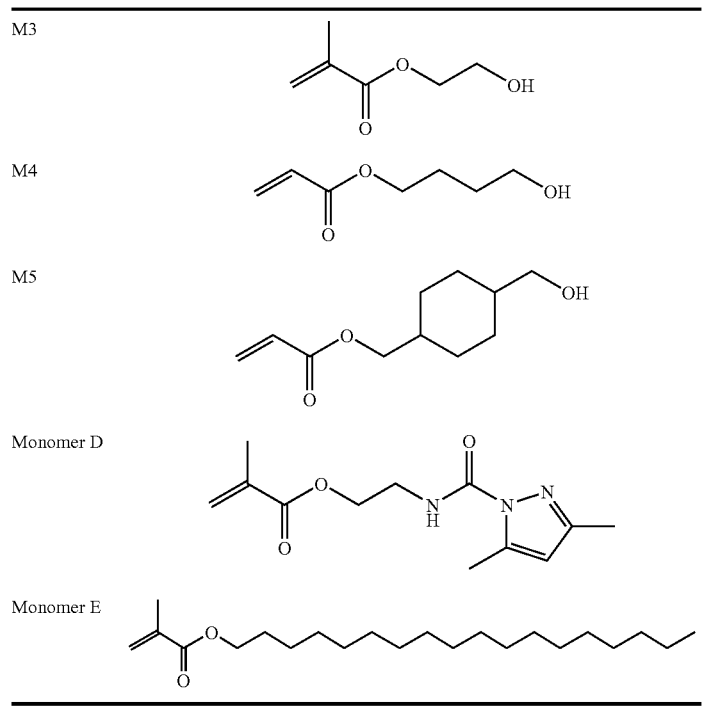

The monomer A shown in Table 1 is perfluorohexylethyl methacrylate.

With respect to the fluorescent functional group in the monomer B, FM1 is pyrene type, FM 2, 5 and 6 are coumarin type, FM3 is flavone type, and FM4 is benzoxazole type. FM 1 and 3 to 6 were synthesized by methods shown in the following Synthesis Examples 1 to 5. FM2 was purchased from Sigma-Aldrich Japan K.K.

With respect to the monomer C, M1 is α-methacryloxy-γ-butylolactone (GBLMA), M2 is Placcel FM1D (product name, manufactured by Daicel Chemical Industries, LTD.), M3 is 2-hydroxyethyl methacrylate, M4 is 4-hydroxybutyl acrylate and M5 is 1,4-cyclohexanedimethanol monoacrylate.

The monomer D is 2-isocyanatoethyl methacrylate wherein an isocyanate group is blocked by 3,5-dimethylpyrazole.

The monomer E is stearyl methacrylate.

Synthesis Example 1

Synthesis of FM1 (Monomer B)

To a reactor (inner capacity: 100 mL, made of glass) equipped with a stirrer and a dropping funnel, 1-pyrenylmethanol (10.37 g), triethylamine (5.85 g), hydroquinone (0.05 g) and toluene (30 mL) were added and stirred. Then, to the reactor cooled in an ice bath, methacrylic acid chloride (5.17 g) was dropwise added so that the inner temperature became at most 15° C., followed by stirring for further 3 hours.

A solid triethylamine hydrochloride was filtered out from the obtained reaction crude liquid, and the solvent of the filtrate was distilled off under reduced pressure to obtain a crude product. This product was recrystallized by using methanol to obtain 7.13 g of the desired product. The yield was 53%. The measured results of $^1$H-NMR and a visible ultraviolet absorption spectrum are shown below.

$^1$H-NMR (solvent: CDCl$_3$) δ (ppm): 1.97 (3H, s, —CH$_3$), 5.56 (1H, s, transC=CH$_2$), 5.92 (2H, s, —CH$_2$O—), 6.15 (1H, s, cisC=CH$_2$) and from 8.00 to 8.34 (9H, m, Ar—H).

Visible ultraviolet absorption spectrum (solvent: dichloropentafluoropropane) γ (nm): 344.329.

Synthesis Example 2

Synthesis of FM3 (Monomer B)

To a reactor (inner capacity: 50 mL, made of glass) equipped with a stirrer and a dropping funnel, 3-hydroxyflavone (2.02 g), triethylamine (1.12 g), hydroquinone (0.01 g) and dichloromethane (20 mL) were added and stirred. Then, to the reactor cooled in an ice bath, methacrylic acid chloride (1.01 g) was dropwise added so that the inner temperature became at most 15° C., followed by stirring for further 2 hours.

The obtained reaction crude liquid was put in a separatory funnel and washed twice by 20 mL of water. The solvent in the dichloromethane layer was distilled off under reduced pressure to obtain a crude product. This product was recrystallized by using 10% distilled water/methanol to obtain 1.45 g of the desired product. The yield was 56%. The measured result of $^1$H-NMR is shown below.

$^1$H-NMR (solvent: CDCl$_3$) δ (ppm): 2.07 (3H, s, —CH$_3$), 5.80 (1H, s, transC=CH$_2$), 6.39 (1H, s, cisC=CH$_2$) and from 7.36 to 8.29 (9H, m, Ar—H).

Synthesis Example 3

Synthesis of FM4 (Monomer B)

To a reactor (inner capacity: 50 mL, made of glass) equipped with a stirrer and a dropping funnel, 2-(2-hydroxyphenyl)benzooxazole (3.01 g), triethylamine (2.16 g), hydroquinone (0.01 g) and dichloromethane (20 mL) were added and stirred. Then, to the reactor cooled in an ice bath, methacrylic acid chloride (1.90 g) was dropwise added so that the inner temperature became at most 10° C., followed by stirring for further 3 hours.

The obtained reaction crude liquid was put in a separatory funnel and washed twice with 20 mL of water. The solvent in the dichloromethane layer was distilled off under reduced pressure to obtain a crude product. This product was purified by a silica gel column to obtain 2.16 g of the desired product. The yield was 54%. The measured results of $^1$H-NMR and FT-IR are shown below.

$^1$H-NMR (solvent: CDCl$_3$) δ (ppm): 2.17 (3H, s, —CH$_3$), 5.83 (1H, s, transC=CH$_2$), 6.46 (1H, s, cisC=CH$_2$) and from 7.26 to 8.34 (8H, m, Ar—H).

FT-IR (KBr) ν (cm$^{-1}$): 1731 (C=O).

Synthesis Example 4

Synthesis of FM5 (Monomer B)

Firstly, 7-(diethylamino)coumarin-3-carboxylic acid was synthesized by the following method.

To a reactor (inner capacity: 300 mL, made of glass) equipped with a stirrer and a Dimroth condenser, 4-(diethylamino)salicyl aldehyde (10.20 g), diethyl malonate (8.92 g), piperidine (4.49 g) and ethanol (50 mL) were added and stirred. Then, the reactor was heated at the inner temperature of 80° C. and refluxed for 8 hours.

Then, the reactor was cooled at 50° C., and the Dimroth condenser was replaced with a dropping funnel and a 1N potassium hydroxide aqueous solution (60 mL) was dropwise added, followed by stirring for 1 hour.

Then, the reactor was cooled to room temperature, and a 3N hydrochloric acid aqueous solution was dropwise added for neutralization. A precipitated solid was collected by filtration and washed twice by distilled water (20 mL) and three times by methanol (30 mL). The obtained orange colored solid was dried under reduced pressure at 100° C. for 8 hours to obtain 8.19 g of 7-(diethylamino)coumarin-3-carboxylic acid. The yield was 59%. The measured results of $^1$H-NMR and FT-IR are shown below.

$^1$H-NMR (solvent: CDCl$_3$) δ (ppm): 1.27 (6H, t, —CH$_3$), 3.50 (4H, q, —CH$_2$—), 6.53 (1H, s, 8-H), 6.71 (1H, d, 6-H), 7.46 (1H, d, 5-H), 8.66 (1H, s, 4-H) and 12.35 (1H, s, —COOH).

FT-IR (KBr) ν (cm$^{-1}$): 1738 (C=O) and 1665 (C=O).

FM5 was synthesized by using the above obtained 7-(diethylamino)coumarin-3-carboxylic acid.

To a reactor (inner capacity: 100 mL, made of glass) equipped with a stirrer and a dropping funnel, 7-(diethylamino)coumarin-3-carboxylic acid (7.55 g) and toluene (50 mL) were added and stirred. Then, the reactor was heated at the inner temperature of 30° C., and trifluoroacetic anhydride (6.45 g) was dropwise added, followed by stirring for further 5 minutes.

Then, 2-hydroxyethyl methacrylate (4.39 g) was dropwise added so that the inner temperature of the reactor became from 30 to 35° C., followed by stirring for 1 hour.

The obtained reaction crude liquid was put in a separatory funnel and washed twice with a 1N sodium hydroxide aqueous solution (60 mL) and distilled water (60 mL), and the solvent in the toluene layer was distilled off to obtain 12.80 g of a yellow colored solid. This solid was recrystallized by using 10 mass % distilled water/methanol to obtain 7.31 g of the desired product. The yield was 63%. The measured results of $^1$H-NMR, FT-IR, a visible ultraviolet absorption spectrum and a melting point are shown below.

$^1$H-NMR (solvent: CDCl$_3$) δ (ppm): 1.24 (6H, t, —CH$_2$CH$_3$), 1.96 (3H, s, CH$_2$=C—CH$_3$), 3.45 (4H, q, —CH$_2$CH$_3$), from 4.64 to 4.57 (4H, m, —OCH$_2$CH$_2$O—), 5.59 (1H, s, transC=CH$_2$), 6.17 (1H, s, cisC=CH$_2$), 6.46 (1H, s, 8-H), 6.61 (d, 1H, 6-H), 7.35 (d, 1H, 5-H) and 8.41 (1H, s, 4-H).

FT-IR (KBr) ν (cm$^{-1}$): 1759 (C=O) and 1713 (C=O).

Visible ultraviolet absorption spectrum (solvent: dichloropentafluoropropane) 2 (nm): 414.

Melting point: from 104.9 to 105.3° C.

Synthesis Example 5

Synthesis of FM6 (Monomer B)

Firstly, ethyl 7-hydroxycoumarin-3-carboxylicate was synthesized by the following method.

To a reactor (inner capacity: 500 mL, made of glass) equipped with a stirrer and a Dimroth condenser, sodium hydrogencarbonate (1.53 g) and distilled water (250 mL) were added and stirred. 2,4-dihydroxybenzaldehyde (10.00 g) and ethyl cyano acetate (8.23 g) were added thereto, followed by stirring for 16 hours at room temperature.

Then, concentrated hydrochloric acid (15.28 mL) was added thereto, and the reactor was heated at 90° C. and stirred for 7 hours.

A solid precipitated by cooling was collected by filtration and washed twice by distilled water (50 mL), and the obtained solid was dried under reduced pressure at 100° C. for 8 hours to obtain 5.64 g of ethyl 7-hydroxycoumarin-3-carboxyliate. The yield was 33%. The measured result of $^1$H-NMR is shown below.

$^1$H-NMR (solvent: CD$_3$COCD$_3$) δ (ppm): 1.33 (3H, t, —CH$_3$), 4.30 (2H, q, —CH$_2$—), 6.77 (1H, s, 8-H), 6.92 (1H, d, 6-H), 7.73 (1H, d, 5-H) and 8.59 (1H, s, 4-H).

On the other hand, 2-(methanesulfonyloxy)ethyl methacrylate was synthesized by the following method.

To a reactor (inner capacity: 200 mL, made of glass) equipped with a stirrer and a dropping funnel, 2-hydroxyethyl methacrylate (10.12 g), triethylamine (10.10 g) hydroquinone (0.01 g) and methylene chloride (100 mL) were added and stirred. Then, to the reactor cooled in an ice both, methanesulfonylchloride (9.60 g) was dropwise added so that the inner temperature became at most 15° C., followed by stirring for further 2 hours.

The obtained reaction crude liquid was put in a separatory funnel and washed twice by distilled water (200 mL), and the solvent in the methylene chloride layer was distilled off to obtain 13.10 g of 2-(methanesulfonyloxy)ethyl methacrylate. The yield was 81%. The measured result of $^1$H-NMR is shown below.

$^1$H-NMR (solvent: CDCl$_3$) δ (ppm): 1.97 (3H, s, CH$_2$=C—CH$_3$), 3.06 (3H, s, —SO$_2$CH$_3$), from 4.42 to 4.49 (4H, m, —OCH$_2$CH$_2$O—), 5.64 (1H, s, transC=CH$_2$) and 6.18 (1H, s, cisC=CH$_2$).

FM6 was synthesized by using the above obtained ethyl 7-hydroxycoumarin-3-carboxylate and 2-(methanesulfonyloxy)ethyl methacrylate.

To a reactor (inner capacity: 50 mL, made of glass) equipped with a stirrer, ethyl 7-hydroxycoumarin-3-carboxylate (1.40 g), 2-(methanesulfonyloxy)ethyl methacrylate (1.41 g), potassium carbonate (1.73 g), tetrabutyl ammonium bromide (0.20 g), hydroquinone (0.01 g) and N,N-dimethyl formamide (30 mL) were added and stirred. Then, the reactor was heated at the inner temperature of 100° C. and stirred for 1 hour.

The reaction crude liquid was put in distilled water (100 mL), and a precipitated solid was collected by filtration and recrystallized by using methanol to obtain 0.91 g of the desired product. The yield was 44%. The measured results of $^1$H-NMR, FT-IR and a visible ultraviolet absorption spectrum are shown below.

$^1$H-NMR (solvent: CDCl$_3$) δ (ppm): 1.41 (3H, t, —CH$_2$CH$_3$), 1.96 (3H, s, CH$_2$═C—CH$_3$), 4.31 (2H, t, —C(═O)OCH$_2$CH$_2$O—Ar), 4.41 (2H, q, —CH$_2$CH$_3$), 4.55 (2H, t, —C(═O)OCH$_2$CH$_2$O—Ar), 5.62 (1H, s, transC═CH$_2$), 6.15 (1H, s, cisC═CH$_2$), 6.84 (1H, s, 8-H), 6.92 (d, 1H, 6-H), 7.52 (d, 1H, 5-H) and 8.51 (1H, s, 4-H).

FT-IR (KBr) ν (cm$^{-1}$): 1753 (C═O), 1719 (C═O) and 1695 (C═O).

Visible ultraviolet absorption spectrum (solvent: dichloropentafluoropropane) λ (nm): 344.

Examples 1 to 32

Preparation of Oil Repellent Treatment Solutions

Oil repellent treatment solutions were prepared by using monomers A to E shown in Table 1.

Preparation Method 1

In Examples 1 to 26, oil repellent treatment solutions were prepared by the following method.

That is, to a 30 mL glass ampule for polymerization, monomers A to E having charged amounts shown in Table 2, 0.12 g of dimethyl 2,2'-azobis(2-methylpropyonate) as an initiator and 14 g of HCF$_2$CF$_2$OCH$_2$CF$_3$ (manufactured by Asahi Glass Co., LTD., tradename AE-3000) as a solvent were added. The gas inside the ampule was replaced by nitrogen gas, followed by sealing and maintaining in warm water of 60° C. for 16 hours for polymerization to obtain a reaction solution containing a copolymer. The obtained reaction solution was diluted by AE-3000 to obtain oil repellent treatment solutions 1 to 26 wherein the concentration of the copolymer was 0.5 mass %.

Preparation Method 2

In Examples 27 to 32, oil repellent treatment solutions were prepared by the following method.

That is, copolymerization was carried out in the same manner as in the preparation method 1 to obtain a reaction solution except that a mixture of 9.8 g of AE-3000 and 4.2 g of methyl ethyl ketone was used as the solvent. The obtained reaction solution was diluted by 40 g of AE-3000 and dropwise added to 600 g of methanol cooled in an ice bath, and a precipitated solid was collected by filtration and dried under reduced pressure to obtain a polymer (copolymer). 0.5 g of the polymer was dissolved in 99.5 g of CF$_3$CF$_2$CF$_2$CF$_2$CF$_2$CF$_2$CH$_2$CH$_3$ to obtain oil repellent treatment solutions 27 to 32 wherein the concentration of the polymer was 0.5 mass %.

Mass average molecular weights (MW) of the oil repellent copolymers in the oil repellent treatment solutions 1 to 32 are also shown in Table 2.

TABLE 2

| Treament solution | Monomer A Charged amount (g) | Monomer B Type | Monomer B Charged amount (g) | Monomer C Type | Monomer C Charged amount (g) | Monomer D Charged amount (g) | Monomer E Charged amount (g) | MW of copolymer |
|---|---|---|---|---|---|---|---|---|
| Treatment Solution 1 | 5.77 | FM1 | 0.12 | — | — | — | — | 67,000 |
| Treatment Solution 2 | 5.47 | FM1 | 0.12 | M1 | 0.29 | — | — | 71,000 |
| Treatment Solution 3 | 5.47 | FM1 | 0.12 | M2 | 0.29 | — | — | 83,000 |
| Treatment Solution 4 | 5.63 | FM1 | 0.12 | M3 | 0.05 | 0.09 | — | 70,000 |
| Treatment Solution 5 | 5.57 | FM1 | 0.12 | M3 | 0.05 | 0.09 | 0.06 | 69,000 |
| Treatment Solution 6 | 5.77 | FM2 | 0.12 | — | — | — | — | 69,000 |
| Treatment Solution 7 | 5.41 | FM2 | 0.12 | M4 | 0.29 | — | 0.06 | 76,000 |
| Treatment Solution 8 | 5.63 | FM2 | 0.12 | M3 | 0.05 | 0.09 | — | 74,000 |
| Treatment Solution 9 | 5.77 | FM3 | 0.12 | — | — | — | — | 70,000 |
| Treatment Solution 10 | 5.47 | FM3 | 0.12 | M1 | 0.29 | — | — | 73,000 |
| Treatment Solution 11 | 5.47 | FM3 | 0.12 | M2 | 0.29 | — | — | 83,000 |
| Treatment Solution 12 | 5.47 | FM3 | 0.12 | M4 | 0.29 | — | — | 88,000 |
| Treatment Solution 13 | 5.63 | FM3 | 0.12 | M3 | 0.05 | 0.09 | — | 71,000 |
| Treatment Solution 14 | 5.62 | FM3 | 0.12 | M5 | 0.07 | 0.09 | — | 76,000 |
| Treatment Solution 15 | 5.77 | FM4 | 0.12 | — | — | — | — | 66,000 |
| Treatment Solution 16 | 5.47 | FM4 | 0.12 | M1 | 0.29 | — | — | 69,000 |
| Treatment Solution 17 | 5.18 | FM4 | 0.12 | M1 | 0.59 | — | — | 82,000 |
| Treatment Solution 18 | 5.62 | FM4 | 0.12 | M5 | 0.07 | 0.09 | — | 79,000 |
| Treatment Solution 19 | 5.63 | FM4 | 0.12 | M3 | 0.05 | 0.09 | — | 71,000 |
| Treatment Solution 20 | 5.59 | FM4 | 0.12 | M4 | 0.09 | 0.09 | — | 73,000 |
| Treatment Solution 21 | 5.77 | FM5 | 0.12 | — | — | — | — | 65,000 |
| Treatment Solution 22 | 5.47 | FM5 | 0.12 | M1 | 0.29 | — | — | 68,000 |
| Treatment Solution 23 | 5.57 | FM5 | 0.12 | M3 | 0.05 | 0.09 | 0.06 | 65,000 |
| Treatment Solution 24 | 5.77 | FM6 | 0.12 | — | — | — | — | 65,000 |
| Treatment Solution 25 | 5.47 | FM6 | 0.12 | M1 | 0.29 | — | — | 71,000 |
| Treatment Solution 26 | 5.57 | FM6 | 0.12 | M3 | 0.05 | 0.09 | 0.06 | 66,000 |
| Treatment Solution 27 | 5.35 | FM1 | 0.23 | M1 | 0.29 | — | — | 76,000 |
| Treatment Solution 28 | 5.24 | FM1 | 0.35 | M2 | 0.29 | — | — | 77,000 |
| Treatment Solution 29 | 5.46 | FM1 | 0.23 | M3 | 0.05 | 0.09 | 0.06 | 74,000 |
| Treatment Solution 30 | 5.34 | FM1 | 0.35 | M3 | 0.05 | 0.09 | 0.06 | 80,000 |
| Treatment Solution 31 | 5.46 | FM5 | 0.23 | M3 | 0.05 | 0.09 | 0.06 | 68,000 |
| Treatment Solution 32 | 5.34 | FM5 | 0.35 | M3 | 0.05 | 0.09 | 0.06 | 75,000 |

Oil repellent films were formed by using respectively the oil repellent treatment solutions 1 to 32 obtained in Examples 1 to 32, and durability evaluations of visibility and oil repellency of the oil repellent films were carried out in accordance with the following methods. The evaluation results are shown in Table 3.

Preparation of SUS Test Board

By using a washed SUS board as a substrate, an oil repellent treatment solution was applied on it by spin coat method under a condition of 500 rpm for 20 seconds. Then, heat treatment was carried out at 120° for 60 minutes to form an oil repellent film thereby to obtain a SUS test board.

Preparation of Resin Test Board

One having a washed resin film (a liquid crystal polymer film, product name: Vecstar, manufactured by Kuraray Co., LTD.) pasted on a glass board was used as a substrate. An oil repellent treatment solution was applied on the resin film of the substrate by spin coat method under a condition of 500 rpm for 20 seconds. Then, heat treatment was carried out at 1200 for 60 minutes to form an oil repellent film thereby to obtain a resin test board.

Evaluation of Initial Visuality

Each of the SUS test board and the resin test board was irradiated with a black light (wavelength: 365 nm), whereby the development of color of the oil repellent film was visually observed. The results are shown by the following evaluation standards. There was no difference in the results between the SUS test board and the resin test board.

⊚: Development of color is clearly observed.
○: Development of color is observed.
△: Development of color is slightly observed.
X: Development of color is not observed at all.

Evaluation of Initial Oil Repellency

With respect to each of the SUS test board and the resin test board, about a 1 µL n-hexadecane was dropped on the oil repellent film, and the contact angle was measured to evaluate the initial oil repellency. The measured results of the contact angles are shown by the following evaluation standards. There was no difference in the results between the SUS test board and the resin test board.

The measurement of the contact angle was carried out by a sessile drop method under a condition of 25° C. by using CA-A (tradename) manufactured by Kyowa Interface Science Co., LTD. (The same applies hereinafter.).

⊚: At least 660.
○: At least 610 and less than 660.
△: At least 510 and less than 610.
X: Less than 51°.

Solvent Resistance Test

With respect to each of the SUS test board and the resin test board, one droplet of an organic solvent was put on the oil repellent film and after 10 minutes, wiped off by a nonwoven fabric (product name: Clean wiper, manufactured by Kuraray Co., LTD.). As the organic solvent, three types i.e. methylethylkatone (MEK), isopropylalcohol (IPA) and xylene, were used, and evaluations were carried out respectively.

Evaluation of Visibility after Solvent Resistance Test

The states of the oil repellent film before and after the solvent resistance test were visually observed. Further, before and after the test, respectively, the film was irradiated with a black light (wavelength: 365 nm) whereby the development of color of the oil repellent film was visually observed. The results are shown by the following evaluation standards. There was no difference in the results between the SUS test board and the resin test board.

⊚: Visibility is maintained with no change in the film before and after the test.
○: A trace of the droplet remains, but no trace of wiping remains. Visibility is maintained.
△: Traces of the droplet and wiping remain, but visibility is maintained
X: Traces of the droplet and wiping remain, and visibility lowers.

Evaluation of Oil Repellency after Solvent Resistance Test

With respect to each of the SUS test board and the resin test board, about a 1 µL n-hexadecane was dropped on the oil repellent film, and the contact angle was measured. The evaluation standards were the same as in the evaluation of the initial oil repellency. There was no difference in the results between the SUS test board and the resin test board.

TABLE 3

| | | Initial properties | | Solvent resistance test | | | | | |
|---|---|---|---|---|---|---|---|---|---|
| Example | Treament solution | Visibility | Oil repellency | MEK (Visibility) | MEK (Oil repellency) | Xylene (Visibility) | Xylene (Oil repellency) | IPA (Visibility) | IPA (Oil repellency) |
| Ex. 1 | Treament solution 1 | ⊚ | ⊚ | △ | ○ | △ | ○ | △ | ⊚ |
| Ex. 2 | Treament solution 2 | ⊚ | ⊚ | ○ | ⊚ | ⊚ | ⊚ | ⊚ | ⊚ |
| Ex. 3 | Treament solution 3 | ⊚ | ⊚ | ○ | ⊚ | ⊚ | ⊚ | ⊚ | ⊚ |
| Ex. 4 | Treament solution 4 | ⊚ | ⊚ | ⊚ | ⊚ | ⊚ | ⊚ | ⊚ | ⊚ |
| Ex. 5 | Treament solution 5 | ⊚ | ⊚ | ⊚ | ⊚ | ⊚ | ⊚ | ⊚ | ⊚ |
| Ex. 6 | Treament solution 6 | ○ | ⊚ | X | △ | X | ○ | △ | ○ |
| Ex. 7 | Treament solution 7 | ○ | ⊚ | △ | ⊚ | ○ | ⊚ | ⊚ | ⊚ |
| Ex. 8 | Treament solution 8 | ○ | ⊚ | ○ | ⊚ | ○ | ⊚ | ⊚ | ⊚ |
| Ex. 9 | Treament solution 9 | △ | ⊚ | △ | ○ | X | X | △ | ○ |
| Ex. 10 | Treament solution 10 | △ | ⊚ | ○ | ⊚ | ○ | ⊚ | ○ | ⊚ |
| Ex. 11 | Treament solution 11 | △ | ⊚ | ○ | ⊚ | ○ | ⊚ | ⊚ | ⊚ |
| Ex. 12 | Treament solution 12 | △ | ⊚ | ○ | ⊚ | ⊚ | ⊚ | ⊚ | ⊚ |
| Ex. 13 | Treament solution 13 | △ | ⊚ | ⊚ | ⊚ | ⊚ | ⊚ | ⊚ | ⊚ |
| Ex. 14 | Treament solution 14 | △ | ⊚ | ⊚ | ⊚ | ⊚ | ⊚ | ⊚ | ⊚ |
| Ex. 15 | Treament solution 15 | △ | ⊚ | X | ○ | X | ○ | △ | ○ |
| Ex. 16 | Treament solution 16 | △ | ⊚ | ○ | ⊚ | ○ | ⊚ | ⊚ | ⊚ |
| Ex. 17 | Treament solution 17 | △ | ⊚ | ○ | ⊚ | ○ | ⊚ | ⊚ | ⊚ |
| Ex. 18 | Treament solution 18 | △ | ⊚ | ○ | ⊚ | ○ | ⊚ | ⊚ | ⊚ |
| Ex. 19 | Treament solution 19 | △ | ⊚ | ○ | ⊚ | ⊚ | ⊚ | ⊚ | ⊚ |
| Ex. 20 | Treament solution 20 | △ | ⊚ | ○ | ⊚ | ⊚ | ⊚ | ⊚ | ⊚ |
| Ex. 21 | Treament solution 21 | ⊚ | ⊚ | △ | ○ | △ | ⊚ | △ | ⊚ |
| Ex. 22 | Treament solution 22 | ⊚ | ⊚ | ○ | ⊚ | ⊚ | ⊚ | ⊚ | ⊚ |
| Ex. 23 | Treament solution 23 | ⊚ | ⊚ | ⊚ | ⊚ | ⊚ | ⊚ | ⊚ | ⊚ |
| Ex. 24 | Treament solution 24 | ⊚ | ⊚ | △ | ○ | △ | ○ | △ | ⊚ |

TABLE 3-continued

| | | Initial properties | | Solvent resistance test | | | | | |
|---|---|---|---|---|---|---|---|---|---|
| Example | Treatment solution | Visibility | Oil repellency | MEK (Visibility) | MEK (Oil repellency) | Xylene (Visibility) | Xylene (Oil repellency) | IPA (Visibility) | IPA (Oil repellency) |
| Ex. 25 | Treatment solution 25 | ⊙ | ⊙ | ⊙ | ⊙ | ⊙ | ⊙ | ⊙ | ⊙ |
| Ex. 26 | Treatment solution 26 | ⊙ | ⊙ | ⊙ | ⊙ | ⊙ | ⊙ | ⊙ | ⊙ |
| Ex. 27 | Treatment solution 27 | ⊙ | ⊙ | ⊙ | ⊙ | ⊙ | ⊙ | ⊙ | ⊙ |
| Ex. 28 | Treatment solution 28 | ⊙ | ⊙ | ⊙ | ⊙ | ⊙ | ⊙ | ⊙ | ⊙ |
| Ex. 29 | Treatment solution 29 | ⊙ | ⊙ | ⊙ | ⊙ | ⊙ | ⊙ | ⊙ | ⊙ |
| Ex. 30 | Treatment solution 30 | ⊙ | ⊙ | ⊙ | ⊙ | ⊙ | ⊙ | ⊙ | ⊙ |
| Ex. 31 | Treatment solution 31 | ⊙ | ⊙ | ⊙ | ⊙ | ⊙ | ⊙ | ⊙ | ⊙ |
| Ex. 32 | Treatment solution 32 | ⊙ | ⊙ | ⊙ | ⊙ | ⊙ | ⊙ | ⊙ | ⊙ |

Examples 1, 6, 9, 15, 21 and 24 are Comparative Examples wherein the oil repellent copolymers do not have the constituting unit C, and others are Examples of the present invention. As shown by the results in Table 3, as compared, respectively, Example 1 with Examples 2 to 5, Example 6 with Examples 7 and 8, Example 9 with Examples 10 to 14, Example 15 with Examples 16 to 20, Example 21 with Examples 22 and 23, and Example 24 with Examples 25 and 26, in the initial properties (initial visibility and initial oil repellency), there is no difference between Examples and Comparative Examples. However, after the solvent resistance test, while the visibility and oil repellency became very low in Comparative Examples, these properties were excellently maintained with little decrease in Examples. That is, it was confirmed that in Examples, excellent visibility and oil repellency were obtained even after the contact with the solvent, and durability of the oil repellent film was excellent. Thus, since the solvent resistance of the oil repellent film was improved in Examples as compared with Comparative Examples, it is considered that the adhesion between the oil repellent film and the substrate was improved.

Industrial Applicability

The film formed by the oil repellent treatment solution of the present invention has excellent visibility, and among the above mentioned applications, it is particularly preferred for an application for which an examination of the oil repellent film is required, particularly when products are produced, when products are used or when failures of products occur. That is, in an examination to see e.g. if a film is formed at a proper position, if a film is formed in the desired shape or if a film is peeled, changed, etc. by its use condition, there is an advantage such that a defect of a film can be easily detected. Such an application may, for example, be oil seal of bearing; oil seal of a fan motor FDB for cooling LED back light; prevention of oil dispersion of a print substrate; moisture proof, antifouling or corrosion resistance for a product in a process of semiconductor e.g. a semiconductor substrate or wafer; prevention of leakage of micro bearing lubricant grease; prevention of dispersion of micro motor lubricant oil; prevention of dispersion of oil for watch components; prevention of dispersion of oil for a sliding portions of various lenses; prevention of stain on a magnetic head; prevention of creeping flux; lubrication of a voice coil motor for HDD; antifouling or moisture proof for a microscope lens; antifouling, corrosion resistance or moisture proof for optical components of e.g. window materials; lubrication, antifouling, oil repellency or waterproof for rolling components e.g. a roll belt, a printer roll, a rolling roller or a motor fan; antifouling, waterproof, releasing or surface reform for a device e.g. a micro reactor channel, a slide type bubble device or a mold; oil repellency and antifouling for bearing or a gear; antifouling, oil repellency or waterproof for a nozzle of a coating head.

The entire disclosure of Japanese Patent Application No. 2007-007965 filed on Jan. 17, 2007 and No. 2007-181051 filed on Jul. 10, 2007 including specifications, claims and summaries are incorporated herein by reference in their entireties.

What is claimed is:

1. An oil repellent copolymer characterized by comprising a repeating unit (A) having a $C_{2-20}$ polyfluoroalkyl group, a repeating unit (B) having a fluorescent functional group, and a repeating unit (C) being at least one selected from the group consisting of 2-hydroxyethyl (meth)acrylate, 2-hydroxypropyl (meth)acrylate, 4-hydroxybutyl (meth)acrylate, 1,4-cyclohexanedimethanol mono(meth)acrylate, 3-chloro-2-hydroxypropyl (meth)acrylate, a polyoxyalkylene mono(meth)acrylate, a polyoxyethylene mono(meth)acrylate, a polyoxypropylene mono(meth)acrylate, a polyoxyethylene-polyoxypropylene mono(meth)acrylate, α-methacryloxy-γ-butylolactone, 2-acryloyloxyethyl-2-hydroxyethyl phthalate, mono(methacryloyloxyethyl) succinate, a and a monomer of formula (i)

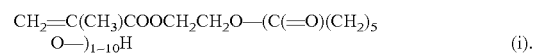

$$CH_2=C(CH_3)COOCH_2CH_2O-(C(=O)(CH_2)_5O-)_{1-10}H \quad (i).$$

2. The oil repellent copolymer according to claim 1, which comprises, as a part or all of the repeating unit (C), a repeating unit having a hydroxyl group, and which further further comprises a repeating unit (D) having an isocyanate group or a blocked isocyanate group.

3. The oil repellent copolymer according to claim 1, which comprises a repeating unit (E) having a linear alkyl group having at least 10 carbon atoms.

4. The oil repellent copolymer according to claim 1, wherein the repeating unit (A) is a repeating unit based on a (meth)acrylate having a $C_{2-20}$ polyfluoroalkyl group.

5. The oil repellent copolymer according to claim 1, wherein the repeating unit (B) is a repeating unit based on a (meth)acrylate having a fluorescent functional group.

6. The oil repellent copolymer according to claim 5, wherein the fluorescent functional group is at least one fluorescent functional group selected from the group consisting of pyrene type, coumarin type, flavone type and benzoxazole type groups.

7. The oil repellent copolymer according to claim 1, wherein a proportion of repeating unit (A) is from 70 to 99 mass % among all repeating units.

8. The oil repellent copolymer according to claim 1, wherein a proportion of repeating unit (A) is from 80 to 95 mass % among all repeating units.

9. The oil repellent copolymer according to claim 1, wherein said fluorescent functional group emits fluorescence by UV light having a wavelength in the range of 300 to 400 nm.

10. The oil repellent copolymer according to claim 1, wherein a proportion of repeating unit (B) is from 0.5 to 10 mass % among all repeating units.

11. The oil repellent copolymer according to claim 1, wherein a proportion of repeating unit (B) is from 2 to 6 mass % among all repeating units.

12. The oil repellent copolymer according to claim 1, wherein a proportion of repeating unit (C) is from 0.5 to 20 mass % among all repeating units.

13. The oil repellent copolymer according to claim 1, wherein a proportion of repeating unit (C) is from 2 to 10 mass % among all repeating units.

14. The oil repellent copolymer according to claim 2, a proportion of repeating unit (D) is from 0.1 to 5 mass % among all repeating units.

15. The oil repellent copolymer according to claim 1, wherein a proportion of repeating unit (D) is from 0.5 to 2 mass % among all repeating units.

16. The oil repellent copolymer according to claim 3, wherein a proportion of repeating unit (E) is from 0.1 to 5 mass % among all repeating units.

* * * * *